United States Patent
Lin et al.

(10) Patent No.: US 11,403,087 B2
(45) Date of Patent: Aug. 2, 2022

(54) OVER-THE-AIR (OTA) MOBILITY SERVICES PLATFORM

(71) Applicant: Motional AD LLC, Boston, MA (US)

(72) Inventors: Tao Lin, Palo Alto, CA (US); Pratikkumar Desai, Santa Clara, CA (US); Rasmus Hjorth Nielsen, Sunnyvale, CA (US); Mahbubul Alam, Mountain View, CA (US); Li Jin, San Jose, CA (US); Revanth Attam, Santa Clara, CA (US); Leo Dumov, Los Gatos, CA (US); Suhasini John Gadam, San Jose, CA (US); Atul Ashok, San Francisco, CA (US); Sneha Prasad Alam, Mountain View, CA (US); Dhanaji More, Sunnyvale, CA (US); Mohamed Karkori, San Francisco, CA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 16/447,881

(22) Filed: Jun. 20, 2019

(65) Prior Publication Data
US 2019/0391800 A1 Dec. 26, 2019

Related U.S. Application Data

(60) Provisional application No. 62/687,723, filed on Jun. 20, 2018.

(51) Int. Cl.
*G06F 8/60* (2018.01)
*G06F 8/65* (2018.01)
(Continued)

(52) U.S. Cl.
CPC ............ *G06F 8/65* (2013.01); *H04L 67/34* (2013.01); *G06F 8/60* (2013.01); *G06F 8/61* (2013.01);
(Continued)

(58) Field of Classification Search
CPC ..... G06F 8/65; G06F 8/60; G06F 8/61; G06F 8/62; G06F 8/658; H04L 57/34;
(Continued)

(56) References Cited

U.S. PATENT DOCUMENTS 9,128,798 B2 9/2015 Hoffman et al.
9,444,892 B1 9/2016 Amireddy et al.
(Continued)

FOREIGN PATENT DOCUMENTS

WO WO 2017035536 3/2017

OTHER PUBLICATIONS

Weimin Li et al., A Resource Service Model in the Industrial IoT System Based on Transparent Computing, PMC, 2018, retrieved online on Feb. 26, 2022, pp. 1-22. Retrieved from the Internet: <URL: https://www.ncbi.nlm.nih.gov/pmc/articles/PMC5948589/pdf/sensors-18-00981.pdf>. (Year: 2018).*

(Continued)

*Primary Examiner* — Hanh Thi-Minh Bui
(74) *Attorney, Agent, or Firm* — Fish & Richardson P.C.

(57) ABSTRACT

An over-the-air (OTA) mobility service platform (MSP) is disclosed that provides a variety of OTA services, including but not limited to: updating software OTA (SOTA), updating firmware OTA (FOTA), client connectivity, remote control and operation monitoring. In some exemplary embodiments, the MSP is a distributed computing platform that delivers and/or updates one or more of configuration data, rules, scripts and other services to vehicles and IoT devices. In some exemplary embodiments, the MSP optionally provides (Continued)

data ingestion, storage and management, data analytics, real-time data processing, remote control of data retrieving, insurance fraud verification, predictive maintenance and social media support.

24 Claims, 24 Drawing Sheets

(51) Int. Cl.
  H04L 67/00    (2022.01)
  G06F 8/61     (2018.01)
  G06F 8/658    (2018.01)
  H04L 67/10    (2022.01)
  H04L 67/60    (2022.01)

(52) U.S. Cl.
  CPC .............. G06F 8/658 (2018.02); H04L 67/10 (2013.01); H04L 67/32 (2013.01)

(58) Field of Classification Search
  CPC ....... H04L 67/32; H04L 67/34; H04L 67/125; H04L 67/10; H04L 67/1095
  See application file for complete search history.

(56) References Cited

U.S. PATENT DOCUMENTS

| | | | |
|---|---|---|---|
| 9,519,505 B1* | 12/2016 | Murray | G06F 9/50 |
| 2003/0114965 A1 | 6/2003 | Fiechter et al. | |
| 2009/0150878 A1* | 6/2009 | Pathak | G06F 8/65 717/172 |
| 2013/0317732 A1 | 11/2013 | Borg et al. | |
| 2016/0291940 A1 | 10/2016 | Searle et al. | |
| 2017/0060567 A1 | 3/2017 | Kim et al. | |
| 2017/0262274 A1* | 9/2017 | Vangelov | G06F 8/65 |
| 2018/0081670 A1 | 3/2018 | Caushi et al. | |

OTHER PUBLICATIONS

EP Search Report and Written Opinion in European Appln. No. 19180861.7, dated Oct. 24, 2019, 9 pages.

DK Examination Report in Danish Appln. No. PA201870700, dated Jan. 23, 2019, 8 pages.

DK 2nd Examination Report in Danish Appln. No. PA201870700, dated Oct. 31, 2019, 4 pages.

* cited by examiner

803
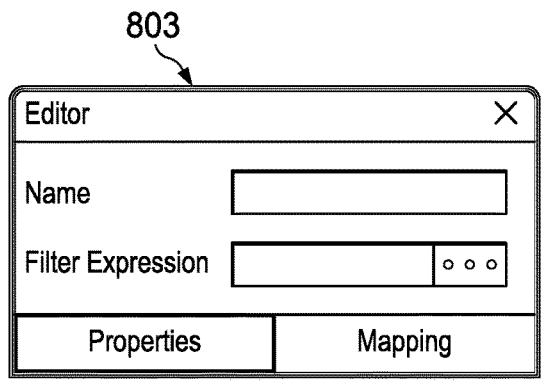
FIG. 8C
804
| | Expression |
|---|---|
| Editor | |
| » Table 1 | If [Column 1] > 10000 then "True" else "False" |
| » Column 1 | |
| » Column 2 | |
| » Column 3 | |
| » Table 2 | |
| » Column 1 | |
| » Column 2 | |
| Properties | Mapping |
FIG. 8D
805
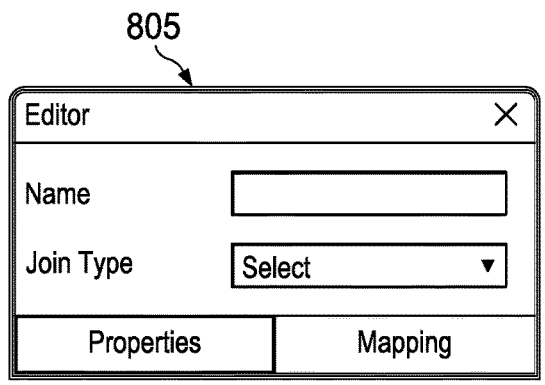
FIG. 8E

Fraud Claim Details
Home > Claims Management > Fraud Claim Details

Fraud Claims

| ☐ Claim ID | Claim Type | Claim Date and Time | Status |
|---|---|---|---|
| ☐ C1_1231456 | Brake Failure | 06/07/2017 10:10:00 | Open |
| ☐ C1_1231456 | Brake Failure | 01/07/2017 11:30:00 | Approved |
| ☐ C1_1231456 | Brake Failure | 16/06/2017 22:10:00 | Rejected |
| ☐ C1_1231456 | Brake Failure | 17/05/2017 14:10:00 | Approved |

1115 On click of the record, below details will be populated.

[ First ] ◄ [ 1 ] of 4 ► [ Last ]

SpeedMPH  RAM X1000

Engine Temperature ⊚ 19    Engine Temperature 106

Indicator status will be considered as "Optimal" if the actual OBO reading is inbetween Min and Max reading.

1117   1116   Ideal Min and Max Readings

| Indicators | Actual Reading [xxx data] | Min Reading | Max Reading | Status |
|---|---|---|---|---|
| Brake Pedal Force | 412 N | 250 N | 880 N | Optimal |
| Deceleration Peak | 73% | 60% | 100% | Optimal |
| Left to Right Brake Imbalance (Front Axle) | 10% | 1% | 30% | Optimal |
| Left to Right Brake Imbalance (Rear Axle) | 30% | 1% | 30% | Optimal |
| Front to Rear Brake Imbalance (Front Axle) | 75% | 60% | 90% | Optimal |
| Front to Rear Brake Imbalance (Rear Axle) | 25% | 10% | 25% | Optimal |

These Ideal Min and Max readings will change according to the car Speed, RPM, Engine Load and Temperature if any of the indicator exceeds the max ideal reading, then there is a high possibility of brake failure.

Result  Fraudulent Claim

Reason  As all indicators are "Optimal", it indicates that there is no brake failure. Hence the claim is FRAUDULENT.

1118   1119

Rejection Comments

[ Comments ]

[ Approve ]   [ Reject ]

[ Hide Previous History ]

| Date | Claim ID | Claimant | Claim | Is Fraud | Status |
|---|---|---|---|---|---|
| 22/06/2014 | CL_1470 | John | Brake Failure | N | |
| 15/07/2015 | CL_2480 | John | Brake Failure | N | |
| 22/08/2017 | CL_4783 | John | Brake Failure | Y | Approved |
| 10/09/2017 | CL_9076 | John | Brake Failure | Y | Rejected |

1120

OVER-THE-AIR (OTA) MOBILITY SERVICES PLATFORM

CROSS-REFERENCE TO RELATED APPLICATION

This application claims priority to U.S. Provisional Patent Application No. 62/687,723, filed Jun. 20, 2018, the entire contents of which are incorporated herein by reference.

TECHNICAL FIELD

This disclosure relates generally to a cloud-based, OTA software platform for providing mobility services to mobility clients.

BACKGROUND

Although a majority of new vehicles are expected to have embedded connectivity within a few years, automotive Original Equipment Manufacturers (OEMs) have not fully taken advantage of the embedded connectivity to remotely managed vehicles to reduce warranty costs and increase customer satisfaction. Furthermore, vehicle features and functional complexity continue to increase, resulting in more Electronic Control Units (ECUs) with more software that require maintenance and upgrades through vehicle life cycles. OEMs need a robust, scalable and efficient vehicle software update management for their customers. With the advent of self-driving vehicles, software update management will become even more challenging because self-driving vehicles have more software to update than manned vehicles.

SUMMARY

An over-the-air (OTA) mobility service platform (MSP) is disclosed that provides a variety of OTA services, including but not limited to: updating software OTA (SOTA), updating firmware OTA (FOTA), client connectivity, remote control and operation monitoring. In some exemplary embodiments, the MSP is a distributed computing platform that delivers and/or updates one or more of configuration data, rules, scripts and other services to mobility clients. In some exemplary embodiments, the MSP optionally provides data ingestion, storage and management, data analytics, real-time data processing, remote control of data retrieving, insurance fraud verification, predictive maintenance and social media support.

In an embodiment, an OTA mobility services platform receives a plurality of user inputs specifying a mobility client model describing and a plurality of software models that are associated with the mobility client model. The mobility client model defines a plurality of hardware components installed on a mobility client that execute software defined by the software models. The plurality of software models also define interdependencies between one or more versions of the plurality of software models. Update files are generated for software updates stored in a data repository. Download information files are also generated that include instructions for downloading and installing the update files. The instructions define an installation order hierarchy that preserves the interdependencies between the one or more versions of the plurality of software models. A distribution task is generated that includes a start time, an end time and a mobility client group, and installation tasks are generated for mobility clients in the mobility client group. In accordance with the installation tasks, the download information files are transferred to the mobility clients in the mobility client group. In accordance with the download information files, the update files are transferred to the mobility clients in the mobility client group.

In an embodiment, the installation tasks are monitored to detect an issue with the installation tasks, and in accordance with detecting an issue and responsive to user inputs, the issue is assigned to a member of a user class of the mobility services platform based on an issue type. A status of the installation tasks is changed after the issue is resolved.

In an embodiment, the mobility client group is determined based on location data provided by the mobility clients in the mobility client group.

In an embodiment, the mobility client group is determined based on the location data and a geofence.

In an embodiment, the OTA mobility services platform is a distributed computing platform that includes a data stream processing pipeline architecture for processing data feeds from mobility clients using a scalable publication/subscription message queue as a distributed transaction log.

In an embodiment, the OTA mobility services platform comprises multiple instances of software that run concurrently and communicate with each other over a message bus.

In an embodiment, the OTA mobility services platform creates virtual representations of the mobility clients that include unique identifiers for the mobility clients and data structures with one or more fields that provide an interface operable for sending and receiving data or services from one or more data or service providers that are external to the OTA mobility services platform. The virtual representation is stored in one or more databases accessible by the OTA mobility services platform.

In an embodiment, a mobility client of an OTA mobility services platform receives a download information file including instructions for downloading and installing update files from a data repository. The instructions define an installation order hierarchy that preserves interdependencies between one or more versions of a plurality of software models defining software installed on the mobility client. In accordance with the instructions, the update files are downloaded to the mobility client. In accordance with the installation order hierarchy, installation of the update files is initiated on the mobility client.

In an embodiment, the installation order hierarchy is determined by a topological sort.

In an embodiment, the download information file includes links to the update files stored in a network-based data repository.

In an embodiment, an OTA mobility services platform for updating software or data on a mobility client causes a graphical user interface (GUI) to be displayed that includes a workflow canvass. One or more user inputs are received that cause a distributed workflow to be created or displayed on the workflow canvass. The distributed workflow includes a plurality of connected display objects, each display object representing a node in the distributed workflow. Configuration data for a data source object is received that selects one of a data streaming pipeline or a data repository, the data streaming pipeline streaming mobility client data received OTA from a mobility client or the data repository storing historical mobility client data. In accordance with the configuration data selecting the data streaming pipeline, applying a data processor to the mobility client data in the data streaming pipeline, the data processor represented by one of the display objects in the distributed workflow. In accordance with the configuration data selecting the data repository, applying the data processor to the historical mobility client data stored in the data repository.

In an embodiment, at least one of the display objects represents a range filter that is applied to data to limit the data to a range of contiguous values.

In an embodiment, at least one of the display objects represents a date filter that excludes data from further processing based on timestamps falling inside or outside a specified date or time range.

In an embodiment, at least one of the display objects represents a filter expression combining one or more values, operators or database functions.

In an embodiment, the configuration data selects the data repository, and at least one of the display objects represent a data transformation that joins two or more columns of data values in a database table stored in the data repository.

In an embodiment, the configuration data selects the data repository, and at least one of the display objects represent a data transformation that sums data values in a single column of a database table stored in the data repository.

In an embodiment, applying the data processor further includes extracting features from data in the data repository, splitting the features into a training data set and test data set; training a model using the training data set, testing the model using the test data set, and storing the model in the data repository.

In an embodiment, applying the data processor further includes applying the model to the mobility client data in the data streaming pipeline, and using an output of the model to predict a state of the mobility client.

In an embodiment, the mobility client is a self-driving vehicle and the mobility client data is sensor data provided by one or more sensors embedded in the self-driving vehicle.

In an embodiment, the one or more user inputs include one or more drag and drop operations, and one or more display objects representing nodes in the distributed workflow are dragged from a tool set in the GUI and dropped on the workflow canvass.

In an embodiment, a method includes: receiving, by one or more processors of an OTA mobility services platform, sensor data from a mobility client; storing, by the one or more processors, the sensor data in a data structure, the data structure associated with a unique identifier for the mobility client and being a copy of a data structure stored on the mobility client; associating, by the one or more processors, the data structure with an instance of an data analysis process running on the mobility services platform, the analytical process applying an analytical model to the sensor data; processing, by the one or more processors, the sensor data in a data stream processing pipeline architecture, the processing including applying the data analysis process to the sensor data and predicting one or more maintenance events for the mobility client based on output of the data analysis process; identifying, by the one or more processors, a severity state for each of the one or more maintenance events; and performing, by the one or more processors, one or more actions in accordance with the one or more maintenance events and severity states.

In an embodiment, the one or more actions include sending an alert message to the mobility client.

In an embodiment, the one or more actions include generating a report including a description of the maintenance action and at least one of a plot of the sensor data or an occurrence history.

In an embodiment, the data analysis process includes applying a machine learning algorithm to the sensor data that is based on at least one of a decision tree regression, random forest regression or gradient-boosted tree regression.

In an embodiment, the one or more maintenances events includes a predicted life expectancy of one or more parts of the mobility client.

In an embodiment, the one or more maintenance events includes at least one of replacing a worn part of the mobility client or replacing a fluid used by the mobility client.

In an embodiment, the sensor data includes data output by a brake pad sensor and a brake fluid sensor, and the one or more maintenance events include a predicted life expectancy of the brake pads and a predicted brake fluid change time.

In an embodiment, the predicted life expectancy of the brake pads has a severity state based on a mileage range calculated from the sensor data.

In an embodiment, the predicted braked fluid change time has a severity state based on brake fluid viscosity index calculated from the sensor data.

In an embodiment, performing one or more actions includes downloading data to configure or reconfigure one or more software components on the mobility client In an embodiment, a method comprises: obtaining, by one or more processors of an OTA) mobility services platform, insurance claim data; determining, by the one or processors, one or more fraud indicators based on the insurance claim data; obtaining, by the one or more processors, vehicle data based on the one or more fraud indicators; comparing, by the one or more processors, the vehicle data with indicator ranges; and responsive to the comparing, generating, by the one or more processors, a fraud verification report.

In an embodiment, the vehicle data is included in an on-board diagnostics report received through an OTA service from a vehicle.

In an embodiment, the vehicle data is historical vehicle data obtained from a data repository of the mobility services platform.

In an embodiment, user input is received that indicates approval or rejection of the insurance claim based on the fraud verification report.

In an embodiment, the one or more fraud indicators includes at least one of brake pedal force, de-acceleration peak or brake imbalance.

In an embodiment, the vehicle data includes at least one of speed, location or sensor data.

In an embodiment, the vehicle data is compared to minimum and maximum values for the fraud indicators.

In an embodiment, the fraud verification report includes a claims history associated with a claimant.

In an embodiment, the fraud verification report is sent by the OTA mobility services platform to an insurance provider that provided the insurance claim data.

In an embodiment, the OTA mobility services platform notifies a claims manager by at least one of e-mail notification, alert notification through a dashboard provided by the OTA mobility services platform through a web service or text message In an embodiment, a method includes: selecting, by one or more processors of an OTA mobility services platform, one or more keywords from one or more mobility client models; importing, by the one or more processors, social media data retrieved from one or more social media platforms; extracting, by the one or more processors, portions of the social media data that match the one or more keywords; identifying, by the one or more processors, one or more owners of mobility clients described or otherwise identified by the one or more key words; and sending, by the one or more processors, one or more communications to the one or more owners that include some or all of the matching social media data.

In an embodiment, the social media data is filtered to remove extraneous symbols and words.

In an embodiment, the one or more communications include electronic mail communications that include a message for the owner.

In an embodiment, the message includes at least a portion of the social media data.

In an embodiment, the social media data is a Tweet®.

In an embodiment, the one or more keywords include an IoT device name.

In an embodiment, the one or more keywords include a make or model of a vehicle.

One or more embodiments of the disclosed mobility service platform provide one or more of the following advantages. The MSP provides users with a reliable, efficient, secure and scalable cloud based management solution to remotely manage and update software and other data on mobility clients. The MSP provides a number of OTA services include monitoring, diagnostics and prognostics to optimize performance and utilization of mobility clients. Sensor data from mobility clients are combined with historical data, human expertise and fleet and simulation learning to improve the outcome of prognostics for mobility clients, to discover the root cause of issues related to OTA operations and to resolve those issues.

The details of the disclosed implementations are set forth in the accompanying drawings and the description below. Other features, objects and advantages are apparent from the description, drawings and claims.

DESCRIPTION OF DRAWINGS

FIG. 8C illustrates a properties pane of a filter object, according to an embodiment.

FIG. 8D illustrates a mapping pane of the filter object, according to an embodiment.

FIG. 8E illustrates a properties pane of a join object, according to an embodiment.

FIG. 11B is an example fraud claims verification report, according to an embodiment.

The same reference symbol used in various drawings indicates like elements.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first processor could be termed a second processor, and, similarly, a second processor could be termed a first processor, without departing from the scope of the various described embodiments. The first processor and the second processor are both processors, but they are not the same processor.

The terminology used in the description of the various described embodiments herein is for the purpose of describing particular embodiments only and is not intended to be limiting. As used in the description of the various described embodiments and the appended claims, the singular forms ""an" and "the" are intended to include the plural forms as well, unless the context clearly indicates otherwise. It will also be understood that the term and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

System Overview

Figure 1:
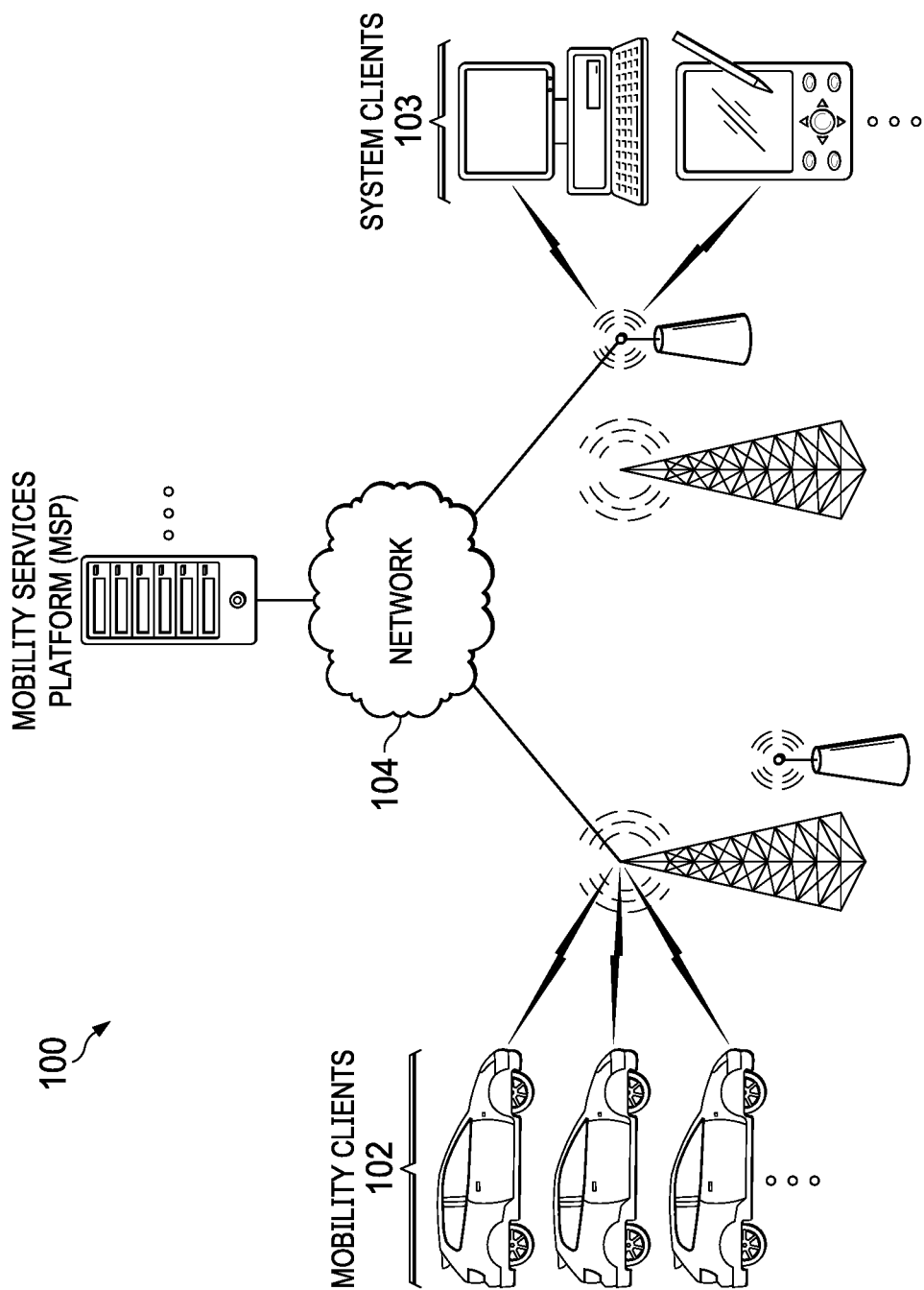
FIG. 1 is a block diagram of a system that includes a mobility services platform for providing mobility services to mobility clients, according to an embodiment.

FIG. 1 is a block diagram of a system that includes a mobility services platform for providing mobility services to mobility clients, according to an embodiment. System 100 includes Mobility Services Platform (MSP) 101, mobility clients 102 and system clients 103. Each of these entities communicates with the other entities through network 104. In an embodiment, MSP 101 is a secure, distributed computing platform that provides a variety of OTA services, including but not limited to: updating software OTA (SOTA), updating firmware OTA (FOTA), client connectivity, remote control and operation monitoring. In addition to software and firmware updates, MSP 101 may deliver and/or update one or more of configuration data (e.g., vehicle or component models), rules (e.g., data stream processing patterns), scripts (e.g., security scripts) and services (e.g., a software plugin to the mobility client). MSP 101 also provides data ingestion, storage and management, data analytics, real-time data processing and remote control of data retrieving.

Mobility clients 102 include any type of vehicle, vessel or device, including any Internet of Things (IoT) device. Some examples of mobility clients include but are not limited to: any type of vehicle or vessel (including electric, hybrid and self-driving vehicles or vessels), automated delivery robots, drones, etc. Some examples of vehicles include any 4-wheel, three-wheel or two-wheel vehicles (e.g., passenger cars, motorcycles, trucks, buses, off-road vehicles, Trikes, Reverse-Trikes, ATVs, Tuk-Tuks, mobility scooters). System clients 103 can include any individual or entity that provides software, data or content to mobility clients 102. System clients 103 can communicate with MSP 101 using a web portal, data feed, mobile application or any other suitable communication mode. Network 104 is any wireless communications network, or collection of networks, suitable for data or SOTA bi-directional communications with a large number of mobility clients.

An IoT device is any physical device, vehicle, appliance or other object that includes one or more of electronics, software, sensors, actuators and connectivity, and which enables the IoT devices to connect and exchange data (e.g., stereo/mono camera, LIDAR, radar, navigation system, entertainment system, ECU, TCU, etc.).

Example Mobility Services Platform (MSP)

Figure 2:
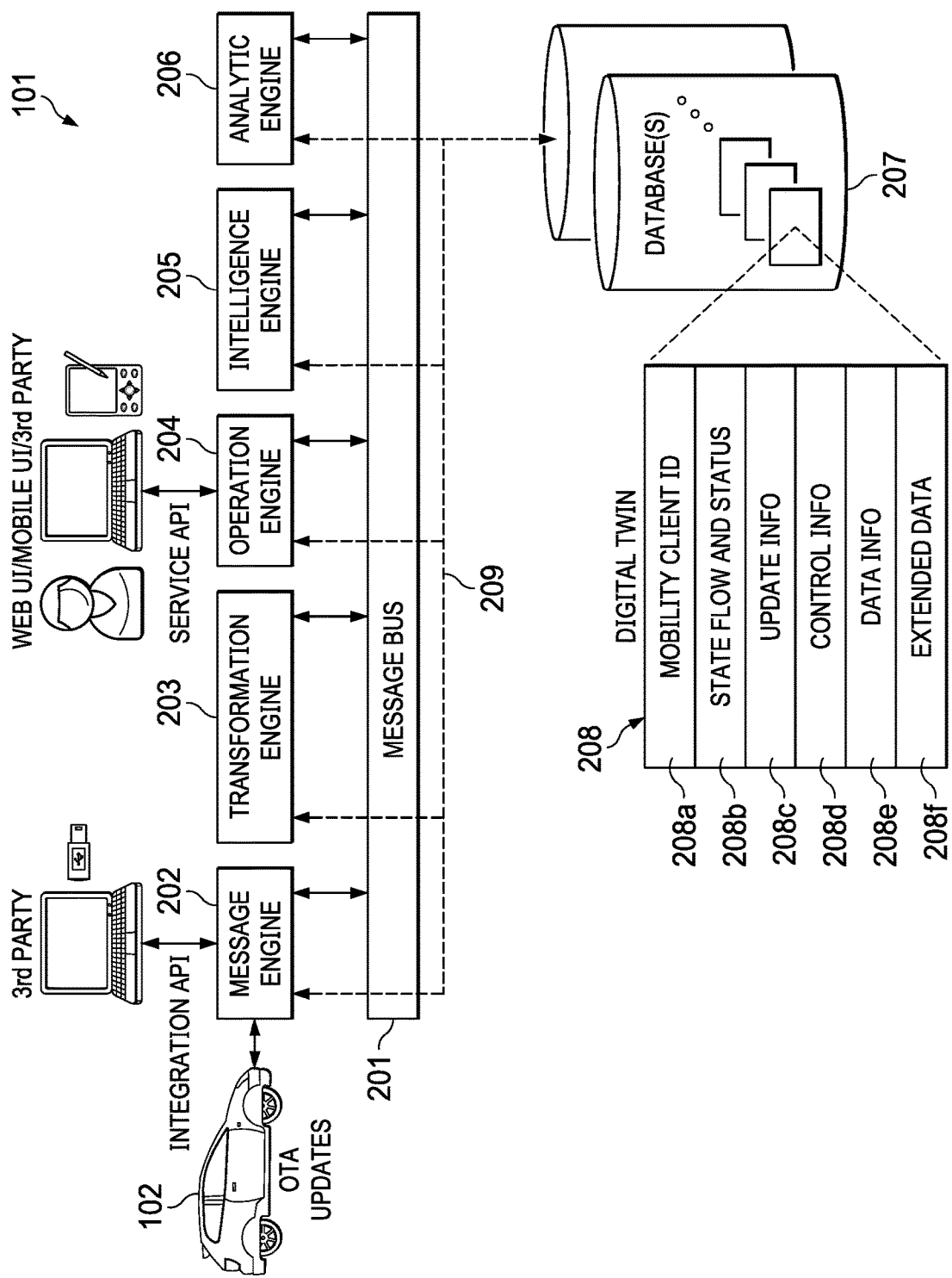
FIG. 2 is a block diagram of a mobility services platform, according to an embodiment.

FIG. 2 is a block diagram of MSP 101, according to an embodiment. MSP 101 includes a plurality of interconnected processors, routers, hubs, gateways, storage devices and other hardware that communicate data, commands and signals, over one or more buses. In an embodiment, MSP 101 is a distributed computing platform that includes a data stream processing pipeline architecture for processing real-time data feeds using a scalable publication/subscription message queue as a distributed transaction log.

In some exemplary embodiments, MSP 101 includes message bus 201, message engine 202 and database(s) 207. In some exemplary embodiments, MSP 101 optionally includes transformation engine 203. In some exemplary embodiments, MSP 101 optionally includes operation engine 204. In some exemplary embodiments, MSP 101 optionally includes intelligence engine 205. In some exemplary embodiments, MSP 101 optionally includes analytic engine 206. In an embodiment, one or more of engines 202-206 are each an instance of a software method that runs on one or more servers of MSP 101. These software instances are configured to communicate with each other using message bus 201. Multiple instances of engines 202-206 can run concurrently. Engines 202-206 provide OTA services (e.g., software updates, client connectivity, remote control and operation monitoring), and data services (e.g., data ingestion, data storage/management, data analytics, real-time processing and data retrieving control).

In an embodiment, a load balancer (not shown) running on one or more servers manages connection requests from mobility clients 102 by listening on one or more ports connected to mobility clients 102 to access OTA services. The load balancer forwards requests to a backend server that has at least one instance of message engine 202 running. In an embodiment, the load balancer maintains persistence (server affinity) to ensure that connections and subsequent requests from mobility clients 102 are sent to the same server after a service interruption (e.g., due to a lost connection). Messages sent by mobility clients 102 can be formatted in any known data-interchange format, such as Extensible Markup Language (XML) or Java® Script Object Notation (JSON).

In an embodiment, message bus 201 is implemented by a distributed streaming platform. The distributed streaming platform publishes and subscribes to streams of messages (also referred to as "records"), stores the streams of messages in database(s) 207 and provides a real-time streaming data pipeline that can transfer the streams of messages between engines 202-206. An example message bus 201 is the Apache Kafka® distributed streaming platform. In an embodiment, consumers of messages can subscribe to a particular "topic" to retrieve messages from message bus 201 for that topic. A topic is a category or feed name to which messages are published. The topics are multi-subscriber and can have zero, one, or many consumers that subscribe to the data written to the topic. Raw input data is consumed from topics and then aggregated, enriched, or otherwise transformed into new topics for further consumption or follow-up processing by other consumers of MSP 101.

In an embodiment, data structure 208 (hereinafter, also referred to as a "digital twin") is created for mobility client devices 102 and stored in one or more databases 207. A digital twin is a cloud-based virtual representation of a mobility client. A digital twin can be used for monitoring, diagnostics and prognostics to optimize performance and utilization of mobility clients 102. Sensor data can be combined with historical data, human expertise and fleet and simulation learning to improve the outcome of prognostics. MSP 101 uses digital twins of mobility clients 102 to discover the root cause of issues related to OTA operations and to resolve those issues. Each instance of each engine 202-206 can create a copy of data structure 208 for a particular mobility client, and read or write data to any field 208b-208f in data structure 208. A copy of data structure 208 for every mobility client 102 can be stored on a plurality of distributed databases. A background process implemented by MSP 101 can maintain coherency between different copies of data structure 208 stored on distributed databases.

In an embodiment, data structure 208 includes a number of fields for exchanging data between mobility clients 102 and MSP 101. In the example shown, the fields include but are not limited to: Mobility Client ID field 208a, State Flow/Status field 208b, Update Info field 208c, Control Info field 208d, Data Info field 208e and Extended Data field(s) 208f. These fields are exemplary and other embodiments of data structure 208 can have more or fewer fields.

Mobility Client ID 208a can be a Universally Unique Identifier (UUID) that uniquely identifies a mobility client. In an embodiment, Mobility Client ID 208a stores a Vehicle Identification Number (VIN) that can be used to uniquely identify a mobility client. State Flow/Status field 208b includes state and session-specific information for persistence (server affinity). Update Info field 208c includes information associated with a particular software update, such as a download information file provided by intelligence engine 205. Control Info field 208d includes commands for remote control of an OTA client, such as a disable command to disable a particular software version installed on the mobility client. For inbound messages, Data Info field 208e includes the name of the mobility client, a timestamp and a link to a software package for the mobility client that is stored in in a software package repository. For outbound messages, the Data Info field 208e is used to send data and commands to the mobility client.

Extended Data field(s) 208f are used to send and receive data or services. Extending Data fields 208f can include links to data or service providers (e.g., URIs, URLs, pointer) or an application programming interface (API). For example, if a mobility client requests a service or data that is hosted by a third party data or service provider external to the MSP, then Extended Data field(s) 208f can provide an interface to the data or service and the MSP will handle the necessary connections to the third party server computers to request and receive results generated by the third party server computers. In this manner, each mobility client will have a digital twin with a number of customized Extended data filed(s) 208f based on the particular services or applications subscribed to by the mobility client. For example, if the mobility client wants to subscribe to a traffic or weather service, access to the traffic or weather service is provided through the Extended Data field(s) 208f of the digital twin for that mobility client. The services can be hosted on third party server computers (e.g., hosted by server farm) or by MSP server computers. The services that can be subscribed to include any service that is available through any mobile application accessible by, for example, a smartphone. This feature is advantageous because it allows integration of mobile applications that the user is already subscribed to on their smartphone or tablet computer to be available in their vehicle through, for example, an entertainment system or vehicle computer.

In an embodiment, third party software can be hosted on servers of MSP 101 and Extended Data field(s) 208f provide access to the services through an API or other interface mechanism. In an embodiment, user profile data can be sent to MSP 101 in Extended Data field(s) 208f. Personal profile information can be any data related to the personal preferences of an operator of the mobility client, including but not limited to: climate control data, seat and mirror adjustment data, entertainment preference data (e.g., radio presets, music playlists), telephone contact lists, navigation data (e.g., history data, destination locations) and any other data that is personalized to a particular operator of the mobility client.

In an embodiment, Extended Data field(s) 208f can include multiple personal profiles. For example, each member of a family who shares the mobility client can have their own personal profile. Also, if the mobility client is part of a fleet of mobility clients (e.g., taxis, rental cars, company vehicles), then personal profiles for each operator can be stored in database(s) 207.

In another embodiment, extended data fields(s) 208f can be used for a Mobile Device Management (MDM) service. For example, MDM data downloaded onto the mobility client can allow or restrict employees from using certain features, including imposing and enforcing policies on the mobility client, such as policies to optimize mobility client usage and secure data. For example, MDM data can configure a mobility client to report mobility client data to MSP 101 where it can be further analyzed. Mobility client data can include but is not limited to: location data (e.g., timestamp, latitude, longitude, and altitude), sensor data (e.g., acceleration data, gyroscope data) and environment data (e.g., temperature data). In an embodiment, the location data can be used to determine if a mobility client has entered or exited a geofence (a virtual geographic boundary) to trigger a download of a software package or perform some other location-based service, as described in reference to FIG. 5.

In an embodiment, geofence crossings can be used to determine if a corporate policy has been violated. For example, drivers for a taxi service may be prohibited from traveling within or outside a certain geographic region enclosed by a geofence. If the mobility client is a self-driving vehicle, then Extended Data fields(s) 208f can include mobility client data specific to self-driving vehicles, such as LiDAR, ultrasonic sensors, radar, Global Navigation Satellite System (GNSS), stereo camera and map data. In an embodiment, the mobile client data can be used by analytic engine 206 to detect and predict various maintenance problems with mobility clients 102, as described in reference to FIGS. 9 and 10.

After the load balancer (not shown) receives a message from a mobility client, the load balancer sends the message to a MSP server that is running an instance of message engine 202. Message engine 202 provides an end-point to communicate with one or more mobility clients 102 and supports both inbound and outbound message processing. The number of message engines 201 that are concurrently running is based on the number of active connections with mobility clients 102. In an embodiment, the load balancer and/or message engine 202 implements one or more protocols for communicating with mobility clients 102, including but not limited to: Transmission Control Protocol/Internet Protocol (TCP/IP), Hypertext Transfer Protocol (HTTP), Hypertext Transfer Protocol Secure (HTTPS), Message Queue Telemetry Transport (MQTT) protocol and Open Mobile Alliance Device Management (OMA-DM) protocol.

In an embodiment, message engine 202 reads the message header and performs version authentication. An integration Application Programming Interface (API) allows third party applications to communicate with message engine 202 over a network (e.g., the Internet). For example, the SOTA service may be unavailable, or the software update may be too large to transfer using the SOTA service. In such cases, the integration API may be used by an application running on a personal computer or mobile device to upload or deliver a software package to a personal computer over a network. After the package is downloaded to the personal computer it can be transferred to a Universal Serial Bus (USB) thumb drive. For example, a technician in a repair shop or dealership can download a software package from MSP 101 to a personal computer, transfer the package to a thumb drive, and then connect the thumb drive directly to a port of a vehicle computer to transfer the software package to the vehicle.

Transformation engine 202 reads the message body and transforms the message body into a common message data format used by message bus 201 (e.g., the Kafka® streaming format).

Operation engine 204 supports data operations, software operations and system issue management. Operation engine 204 provides a Web portal and mobile user interface (UIs) to communicate with system clients 103 (e.g., OEMs, software developers). Operation engine 204 generates reports with visualizations (e.g., charts, tables), which can be viewed on the Web portal and/or mobile UIs, and sends notifications/alerts to system clients 103 using various modes of communication (e.g., email, push notification, text message). Operation engine 204 also provides a service API that allows system clients 103 to access mobility services using their proprietary applications. In an embodiment, the service API supports a payment system that manages billing-based software updates using data retrieved through the service API.

Intelligence engine 205 supports various OTA operations, including software packaging, software dependency checking, scheduling and monitoring.

Analytic engine 206 supports business intelligence, including report generation and alert detection. Analytic engine 206 also provides an Interactive Development Environment (IDE) that includes a dashboard and workflow canvass that allows a data analyst to build, test and deploy distributed workflows using real-time message streams or a database as a data source, as described more fully in reference to FIGS. 7 and 8.

In an embodiment, database(s) 207 include(s) a relational database (e.g., SQL database) and a distributed NoSQL database (e.g., Apache Cassandra™ DBMS with Elasticsearch™ service) for storing messages, data logs, software packages, operation history and other data. The data stored can be either structured or unstructured. In an embodiment, engines 202-206 can communicate with database(s) 207 over data access layer (DAL) 209 using, for example, the Java® EE data access object (DAO).

Example OTA Client Software Architecture

Figure 3A:
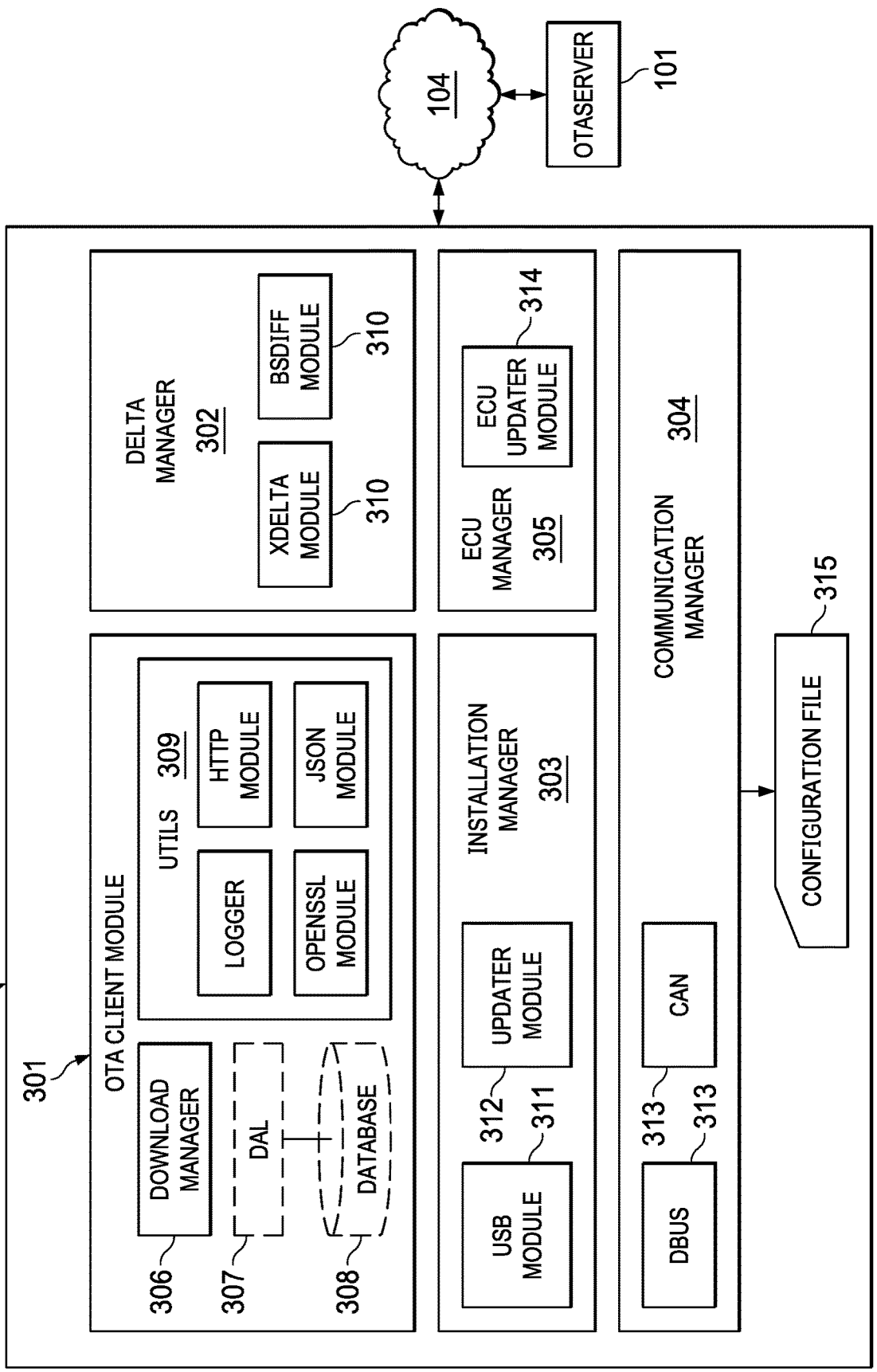
FIG. 3A is a conceptual diagram of OTA client software architecture, according to an embodiment.

FIG. 3A is a conceptual diagram of OTA client software architecture, according to an embodiment. As used in this specification, the term "updates" includes any type of digital computer instructions or data, including but not limited to: software, firmware, object code, machine code, scripts, Java® bytecode, data and metadata. The examples that follow refer to updating firmware of an Electronic Control Unit (ECU) or Transmission Control Unit (TCU). ECUs and TCUs are associated with automobiles (See FIG. 16). The description that follows, however, is also applicable to any electronic controller, microcontroller unit (MCU) or other hardware processor that executes an instruction whether or not embedded in any electronic device or IoT device, Application Specific Integrated Circuits (ASICs), System-on-Chip (SoC) and Central Processing units (CPUs).

In an embodiment, OTA client software architecture 300 includes OTA client module 301, delta manager 302 and installation manager 303. In exemplary embodiments, architecture 300 optionally includes communication manager 304. In exemplary embodiments, architecture 300 optionally includes ECU manager 305. In exemplary embodiments, OTA client module 301 optionally includes one or more of download manager 306, data abstraction layer (DAL) 307, local database 308 and utility modules 309. In exemplary embodiments, delta manager 302 optionally includes delta compression tools 310 (e.g., XDELTA3, BSDIFF). In exemplary embodiments, installation manager 303 optionally includes one or more of USB module 311 and Updater module 312. In exemplary embodiments, communication manager 304 optionally includes bus interfaces 313. In exemplary embodiments, ECU manager 305 optionally includes ECU updater module 314.

Download manager 306 of OTA client module 301 communicates with MSP 101 over network 104 using a wireless protocol (e.g., OMA-DM 2.0 protocol). DAL 307 provides an interface to connect to local database 308 (e.g., SQLite database). DAL 307 is an object-oriented system that provides an interface to connect database 308 with external applications and performs database-related operations. DAL 307 also stores metadata related to installation logs generated by OTA client module 301 and ECU manager 305 during installation operations on ECUs. Utility modules 309 include a logger module for generating communication logs, HTTP module for managing HTTP connections, OpenSSL module for managing OpenSSL connections and JSON module for managing JSON connections.

Delta manager 302 is responsible for generating the difference between two files using one of delta compression tools 310. Delta manager 302 is also capable of reconstructing a new updated software image by applying delta (diff) files on base files of the software being updated.

Update module 312 of installation manager 303 provides update and rollback operations. The rollback operation provides a fail-safe mechanism whereby if during an update process, the installation manager 303 fails to update the base firmware with new firmware, the base firmware is restored by the rollback operation to the last firmware version. USB module 311 manages connections with USB thumb drives to receive updates as an alternative to the OTA service.

Communication manager 304 manager includes bus interfaces 313, such as Controller Area Network (CAN), FlexRay™, Ethernet and DBUS. CAN is a vehicle bus standard designed to allow microcontrollers and devices to communicate with each other in applications without a host computer. DBUS is an inter-process communication (IPC) and remote procedure call (RPC) mechanism that allows communication between multiple computer programs concurrently running on the same machine.

Communication manager 304 provides data transfer operations between applications. In an embodiment, communication manager 304 is a dynamic library where applications can link to communication manager 304 to use its services. A request from an application linked with the communication manager 304 to send data is broadcast over a bus (e.g., CAN, DBUS). Similarly, a request from any application linked with communication manager 304 to receive data would read data over the bus. The selection of channel is determined through configuration file 315, which has a one-to-one mapping between applications and corresponding services of the communication manager 304. An interface abstraction layer is used support interfaces other than CAN, such as Ethernet and FlexRay™.

ECU manager 305 is the core engine which coordinates communication between OTA client module 301 and a particular target ECU or data client, as well as manage its own internal state. ECU updater module 314 is responsible for transferring new ECU software to target ECUs, which it receives from OTA client module 301. ECU updater module 314 is also responsible for transferring target ECU data (e.g., sensor data) to data clients. In an embodiment, ECU updater module 314 can be ported into the ECUs to perform Software Components Management Object (SCOMO) operations, which is part to of the OMA-DM standard. ECU manager 305 communicates with target ECUs to transfer files using Unified Diagnostic Services (UDS) protocol on CAN, FlexRay™ or Ethernet as the Physical Layer. ECU manager 305 also responds to requests from OTA client module 301 for software version information.

Example OTA Client Processing

Figure 3B:
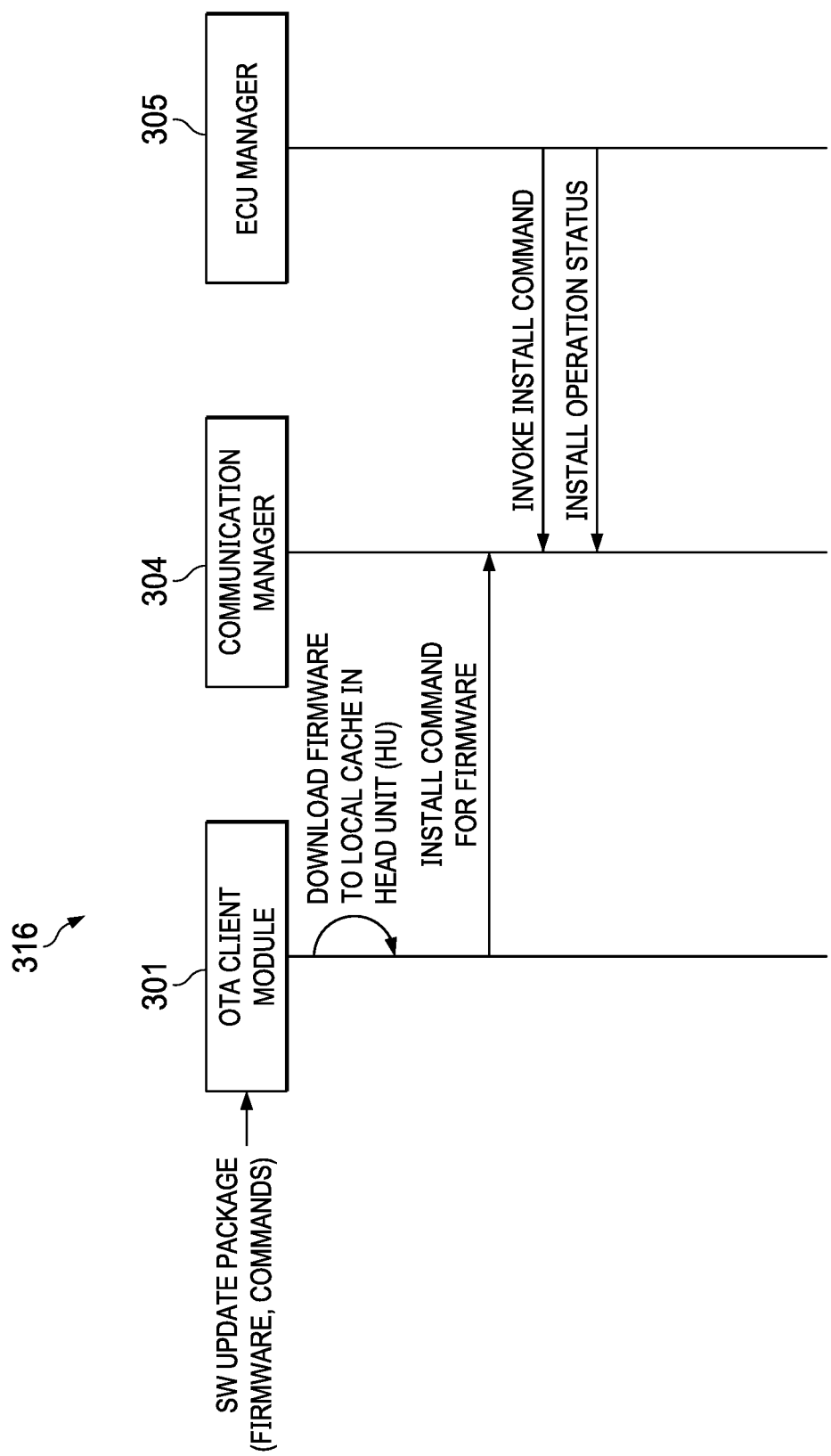
FIG. 3B is an event diagram illustrating OTA client processing of software update packages, according to an embodiment.

FIG. 3B is an event diagram illustrating mobility client processing of update packages for a single ECU upgrade, according to an embodiment. MSP 101 will send a download information file for updating software (in this example firmware) for a single ECU upgrade without an interdependency. In a first download phase, OTC client module 301 retrieves the download information file (e.g., a JSON file) from MSP 101, and, in a second download phase, downloads the firmware from a data repository using links in the download information file. The download information file is stored by OTC client module 301 in local database 308 (e.g., in local disk memory). The download information file includes installation commands (e.g., scripts) and links to software files stored in a data repository.

OTA client module 301 invokes an install command via communication manager 304. Relevant information (e.g., ECU Identifier (ID), firmware path, firmware version) for the install command is sent to communication manager 304. Communication manager 304 informs ECU manager 305 to trigger an update firmware command. ECU manager triggers the update firmware command, and reports back the status of the update operation (e.g., a success or error code) to OTA client module 301 via communication manager 304. OTA client module 301 then reports the appropriate success/fail alerts to MSP 101. After the report is sent, the next update for another ECU ID is triggered. This sequence of operations is repeated for all the received commands.

In an embodiment, the download information file retrieved from MSP 101 is encrypted for security using symmetric key encryption or any other suitable encryption technology (e.g., elliptic curve encryption). Prior to installing any updates, OTA client module 301 and MSP 101 perform an authentication procedure to ensure the download information file was retrieved from MSP 101 (a trusted source). For example, the download information file can be digitally signed, and the authentication of the MSP server, client and download information file can be performed using public-key cryptology methods, as described more fully in reference to FIG. 13.

After successful authentication, the contents of the download information file are decrypted, and OTA client module 301 downloads the firmware files from the data repository. For example, the download information file can include a Uniform Resource Identifier (URI) for each firmware file, such as a Uniform Resource Locator (URL). The URL provides a path for OTA client module 301 to download the firmware file from the data repository. In an embodiment, the data repository is a database hosted by a third-party hosting service that is accessible through a Web service (e.g., an Amazon S3® database).

In another embodiment, MSP 101 will send a download information file (e.g., a script file) for upgrading software (in this example firmware) for multiple ECU upgrades with inter-dependencies. OTC client module 301 downloads the download information file (e.g., JSON file) from MSP 101 and stores the file in local database 308. In an embodiment, topological sorting is used to construct hierarchal topologies to ensure software updates are installed in a manner that will preserve software dependencies between different software models and/or different versions of software models. For independent firmware, each install command is exclusive. For dependent firmware, the order of the installation commands is based on the hierarchal topology using a depth-first search (DFS) algorithm, as described more fully in reference to FIG. 4C.

The update operations proceed as described above for a single ECU. If any of the inter-dependent firmware upgrades fail, all relevant firmware that is previously installed in the sequence is rolled back. OTC client module 301 will invoke the rollback operation with target version information, via communication manager 304. OTA client module 301 then reports the appropriate success/fail alerts to MSP 101 separately for each firmware update/rollback.

In an embodiment, a dedicated controller inside the mobility client is configured to manage the OTA update processes, as described in U.S. Pat. No. 9,128,798, for "Module Updating Device," issued on Sep. 8, 2015, which patent is incorporated by reference herein in its entirety.

Example Data Client Software Architecture

In addition to the OTA client, MSP 101 also supports a data client. The data client shares some of the software components of the OTA client software architecture. The data client perform IoT functions, collects data from various devices, sensors and data analytics functions. In an embodiment, the device client employs OMA-DM protocol for client registration, MQTT for data exchange and REST APIs for log file uploads to the Internet. The data client processes server commands and uploads installation logs to MSP 101 using RESTful APIs via OMA-DM or sensor data using MQTT.

Example Delta Compression

In an embodiment, the data sent to a mobility client is compressed using delta compression technology. With delta compression, two versions of a file can be compared to determine their differences. The differences are included in a differential ("diff") file or "delta" file. Multiple diff files can be generated for every software update based on previous versions and available delta compression algorithms. For example, selection of a diff file can be based on a previous version of the software that is available, the file size, the decode time and the delta compression algorithm that is available. There are several publicly available delta compression algorithms. These delta compression tools include but are not limited to: BSDIFF (bitwise subtraction) and XDELTA3 (VCDIFF RFC 3284).

Not every update scenario requires delta compression. Different delta compression algorithms/tools are suited for different parameters including, for example, file size, computation limitations at client, bandwidth requirements, the urgency of the software update, server-side computation limitations and the location of the reconstruction unit. For example, in a use case it may be important to roll-out a file to a mobility client quickly and bypass delta compression completely. By considering the parameters that are important for a particular application (e.g., the automotive industry) an advanced adaptive methodology for selection can be used where the most appropriate delta compression tool is selected for delta compression. Equation [1] below describes the selection of a delta compression tool based on a function F( ):

$$T_i = F(S, O, \Delta t_d, \Delta t_p, b, P), \quad [1]$$

where S is the reduction in file size, O is the original file size, $\Delta t_d$ is the time to generate the delta file, $\Delta t_p$ is the time to reconstruct the original file, b is the bandwidth restriction and P is the update or transfer priority. In an embodiment, F( ) can be a linear combination of weighted parameters, where each of the parameters (S, O, $\Delta t_d$, $\Delta t_p$, b, P) is assigned a weight $w_i$ (a number between 0 and 1) according to the application as shown in Equation [2]:

$$T = \Sigma_{i=1}^{N} w_i F_i, \quad [2]$$

where N is the number of parameters (e.g., N=6) and $F_i$ is the "ith" parameter. The value of T that results from application of Equation [2] can be mapped to a look-up table of delta compression tools. For example, if T falls within a first range, then the BSDIFF tool is selected, and if T falls within a second range an XDELTA3 tool is selected, and so forth. The weights $w_i$ can be determined empirically.

Example Remote Control and Configuration

In an embodiment, a user of MSP 101 can use a configuration panel to add a set of commands to be downloaded to the OTA client or data client. The user can define operation commands and data commands using the configuration panel. The user (e.g., the SM) can configure a vehicle model, device model and IoT device model. To define a vehicle model, the user adds a vehicle model, make, year, trim and style using a GUI with text fields for inputting these parameters. In addition, the user can enter a configuration type, a configuration command script and a command name. To define a device model or IoT device model, the user adds a device name, manufacturer, description, firmware name, and firmware version. In addition, the user can enter a configuration type, a configuration command script and a command name.

After the model is made "active" by the user, the configuration values set by the SM are downloaded to the mobility client (OTA client or device client). The mobility client can either accept, reject or postpone applying the configuration values. If the mobility client accepts the configuration values, the mobility client applies the configuration values and sends an "Accept" status to MSP 101 indicating that the values were accepted by the mobility client and the status is stored in database (s) 207. If the mobility client rejects or postpones the configuration values, the mobility client does not apply the configuration values and sends a "Reject" or "Postponed" status to MSP 101 indicating that the values were rejected or postponed, respectively, by the mobility client and the status is stored in database(s) 207. The SM can view the status of all the configurations in the SM dashboard.

Example Software Update Planning

In embodiment, software update planning includes five phases: software upload, approval, campaign task creation, distribution task creation and installation task creation. Each of these phases is the responsibility of a user class. Hereinafter, "user" refers to a registered MSP 101 user. In an embodiment, MSP 101 supports the following user classes (hereinafter also referred to as "roles") for software update planning: System Administrator, Content Manager, Software Manager, Campaign Approver, Campaign Manager, Deployment Manager and Executive. The System Administrator (SA) manages the creation of users and contacts, approves or rejects user creation requests, creates or suspends organizations and creates or deletes roles. The Content Manager (CTM) manages creation of new mobility client models and mobility clients (e.g., vehicles, IoT devices), handles creation of new component models and component dependency, handles create of new components, manages software models and maps software dependencies. The Software Manager (SM) manages software uploads and uploads base versions and latest versions to software models. The Campaign Approver (CA) approves or rejects uploaded software versions. The Campaign Manager (CM) creates and manages Campaign Tasks for distribution of software updates based on mobility client groups, tracks status of total number of download and installation successes and failures. The Deployment Manager (DM) creates and schedules Distribution Tasks, tracks status of Installation Tasks and tracks installation issues. The Executive accesses dashboards and visualizations (e.g., charts, tables).

Each user is required to register with MSP 101 through a Web portal and provide authentication information (e.g., user ID and password) during login. In an embodiment, each user class has a dedicated graphical user interface (GUI) referred to as a "dashboard" that provides static and/or real-time visualizations (e.g., charts, tables, 2D/3D graphics), and input mechanisms (e.g., menus, text input boxes, buttons, check boxes, links, etc.) that are tailored to the duties and responsibilities of the user class. Although the software update planning described above utilizes human intervention, in another embodiment the tasks performed by the human users can be completely or partially automated by MSP 101 without human intervention.

Figure 4A:
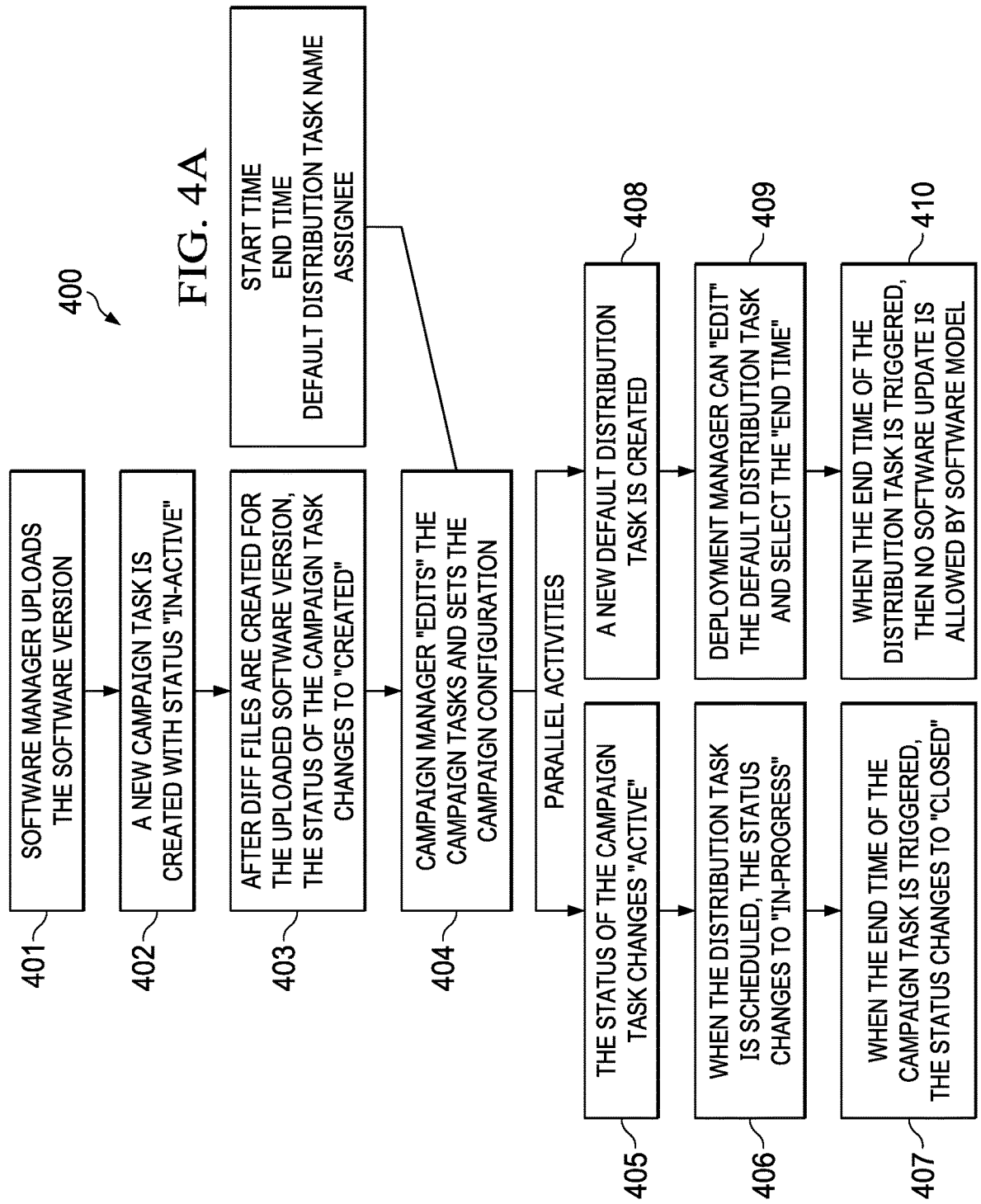
FIG. 4A is a flow diagram of a planning process for a software update, according to an embodiment.

FIG. 4A is a flow diagram of a planning process 400 for a software update, according to an embodiment. Process 400 can be implemented using MSP 101 architecture shown in FIG. 2. Process 400 begins when the SM uploads the software version (401). Upon receipt of the software version, a new Campaign Task is automatically created with "Inactive" status (402). Diff files are then automatically generated for the uploaded software version and "Inactive" status is automatically changed to "Creation" status (403). At this point, the CM can edit the Campaign Task and set the Campaign Configuration using the CM dashboard. Some examples of edits include a start time and end time of the Campaign Task, and a default DM assignee for the Distribution Task. Because it is contemplated that there may be multiple DMs, the CM can assign a default DM, which can be reassigned later by the CM based on the work load of the default DM.

The CM can configure a vehicle grouping (a group of vehicles included in the Campaign Task) by selecting vehicle parameters (e.g., make, model, year, geography, dealer vs. owner, etc.) from one or more dropdown menus, then clicking a save button to save the selection. When the CM is done editing, the CM can start a new campaign by pressing a Start New Campaign button in the CM dashboard. A new Campaign Task can include a single update to a single ECU or multiple updates to multiple ECUs, as described in reference to FIG. 3B. In an embodiment, non-critical updates are bundled to multiple ECUs that share a same vehicle configuration with similar update priority and due dates.

Process 400 continues with two parallel sets of activities. In a first set of activities, the status of the Campaign Task changes to "Active" (405). When the Distribution Task is scheduled, "Active" status changes to "In-Progress" status. When the end time of the Campaign Task is triggered, "In-Progress" status changes to "Closed" status (407). In a second set of activities, a new default Distribution Task is created (408). The DM can edit the default Distribution Task and select a new end time (409). When the new end time of the Distribution Task is triggered, no software update is allowed (410).

In an embodiment, the DM can use DM dashboard to create, add or edit a Distribution Task, select a distribution method and creating an Installation Task. For example, the DM can select time slots to schedule OTA update appointments with vehicle owners. The DM can enter an approved update time, a total number of vehicles to receive the update and an appointment time with the vehicles. The DM can select a distribution method from a list of distribution methods including but not limited to: Geo Region, Group and Geofence. If Geo Region is selected, the software update will be distributed to the vehicle grouping in a specified geographic region, such Western United States or Northern California. If Group is selected, the software update will be distributed to the vehicle grouping regardless of the locations of the vehicles in the group. If Geofence is selected, the software update will be delivered to the vehicle grouping for only those vehicles that are within a specified geofence. Accordingly, software updates can be targeted, to vehicle groupings, geographic regions and particular areas within a geographic region.

Figure 4B:
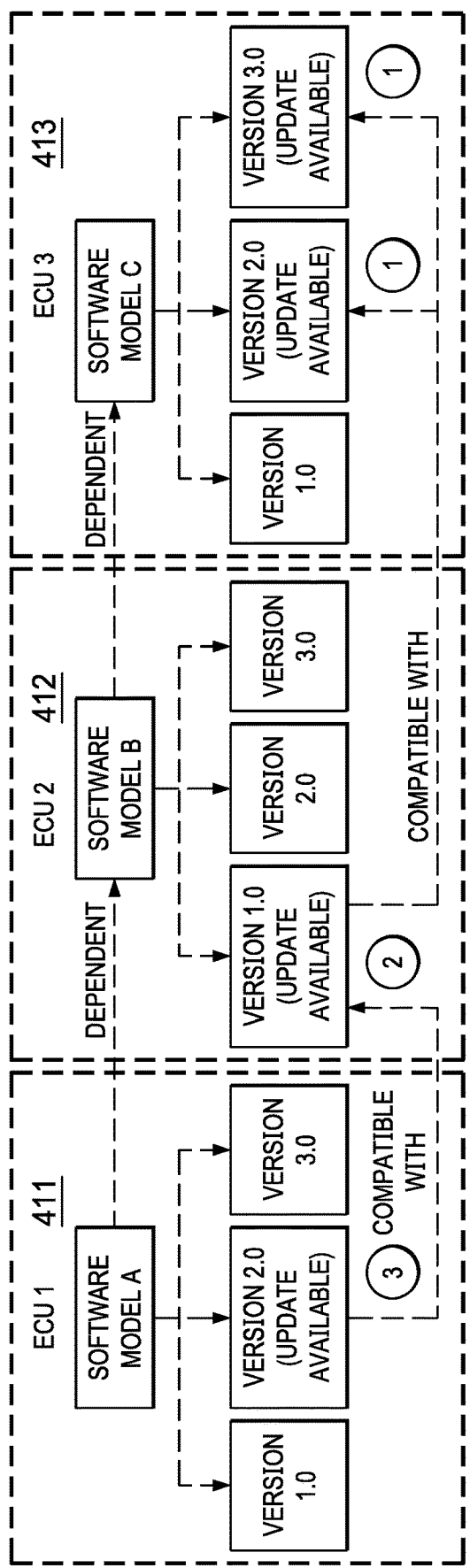
FIG. 4B is a diagram illustrating software dependencies between software models, according to an embodiment.

FIG. 4B is a diagram illustrating software dependencies between software models, according to an embodiment. Using a dashboard, a user (e.g., an SM) can add, edit, view, clone, upload, delete and save one or more software models and their dependencies. A software model is defined by software model, software model name, software type (e.g., application), component model, vendor, available software model (e.g., a list of software models added within the system with base version uploaded) and dependent model. The user can define software compatibility details with different versions of the dependent software model while uploading a new software file for the selected software model.

Referring to FIG. 4B, assume the user adds Software Model A and also adds a software dependencies with Software Model B and Software Model C. In this example, Software Model A is installed on ECU 411, Software Model B is installed on ECU 412 and Software Model C is installed on ECU 413. This creates a software model hierarchy: Software Model A->Software Model B->Software Model C. Also assume that in some embodiments Software Model B has Versions 1.0, 2.0, 3.0 and 4.0, and that Software Model C has Versions 1.0, 2.0 and 3.0. While uploading Version 2.0 for Software Model A, the user selects at least one of the versions for Software Model B and/or Software Model C as being dependent on Version 2.0 of Software Model A. MSP 101 checks for software dependencies and compatibility (if any) for Software Models A, B and C based on the software configuration details sent by the mobility client. If any updates are found for multiple dependent software, MSP 101 sends two sets of download links to the mobility client.

A first set of download links includes a single download link to a single software package that includes updates for all the Software Models A, B and C to be updated. A second set includes download links to individual software update packages for each software model. The software installations to be executed on the mobility client are chained and downloaded in a leaf-to-node hierarchical data structure. The installation sequence executed on the mobility client is based on the model dependency described by the user in the dashboard.

Referring to the encircled numbers in FIG. 4B, installation manager 303 (FIG. 3) on the mobility client first creates installation tasks starting from the lowest node in the software model hierarchy (3 installation tasks for Software Model C—Version 2.0 and Version 3.0). Next installation manager 303 creates an installation task for the next higher node in the hierarchy (1 installation task for Software Model B—Version 1.0). Next installation manager 303 creates an installation task for the next higher node in the hierarchy (1 installation task for Software Model A-Version 2.0). In an embodiment, a topological sorting algorithm (e.g., Kahn's algorithm) can be run on the mobility client to determine installation order.

Figure 5:
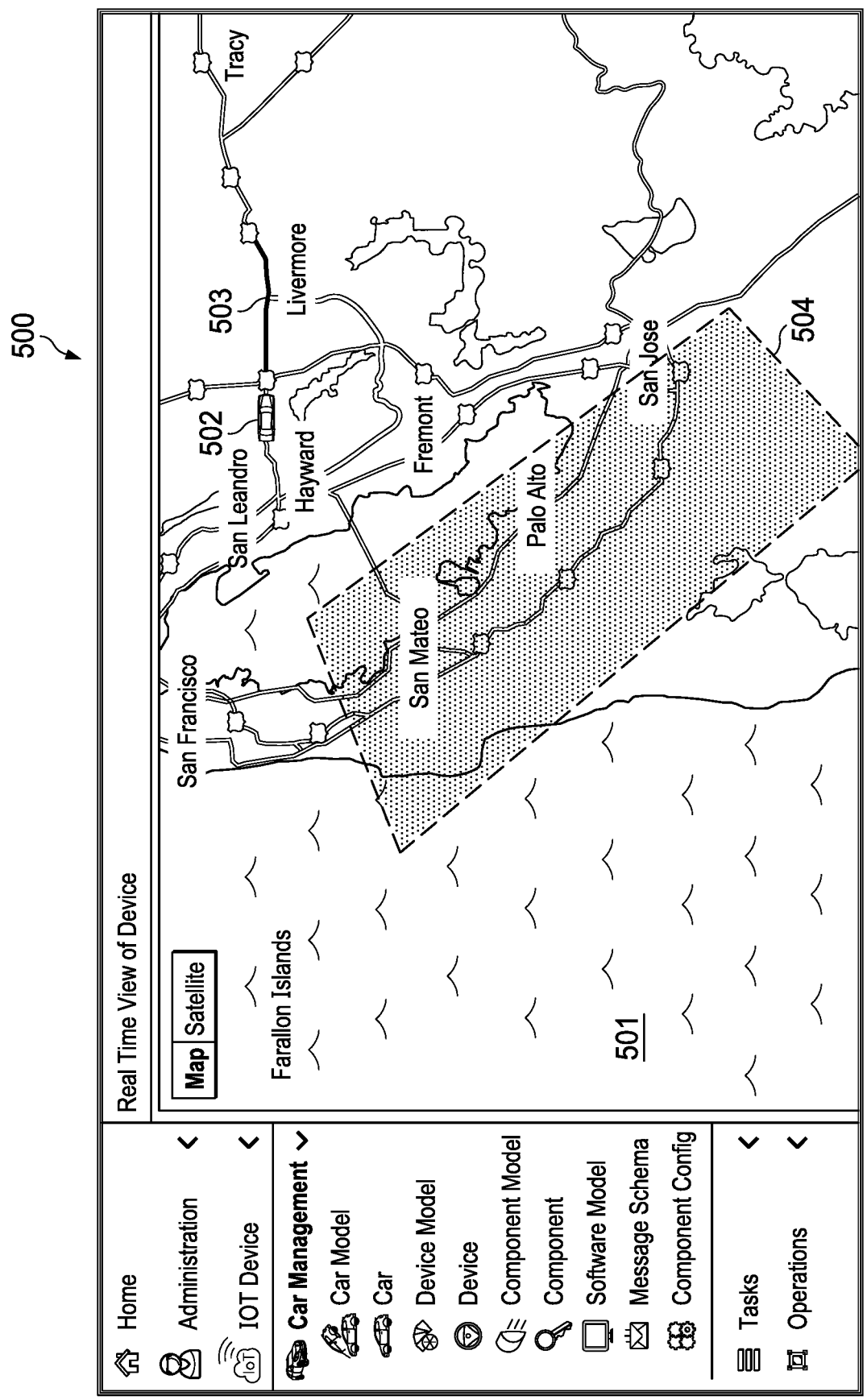
FIG. 5 illustrates a visualization including a map that allows a DM to draw a geofence for software update distributions, according to an embodiment.

FIG. 5 illustrates a visualization for displaying a map that allows a DM to draw a geofence for software update distributions, according to an embodiment. In this example, dynamic and interactive visualization 500 is shown that includes a real-time location 502 of a mobility client on map 501. Route 503 traveled by the mobility client is displayed as a thicker and/or darker line. A user, such as a DM, can use a pointing device to draw a geofence region 504 on map 501. When the mobility client enters geofence region 504, the software update or a notification of a pending software update is sent to the mobility client.

Example Issue Detection and Resolution

Figure 6:
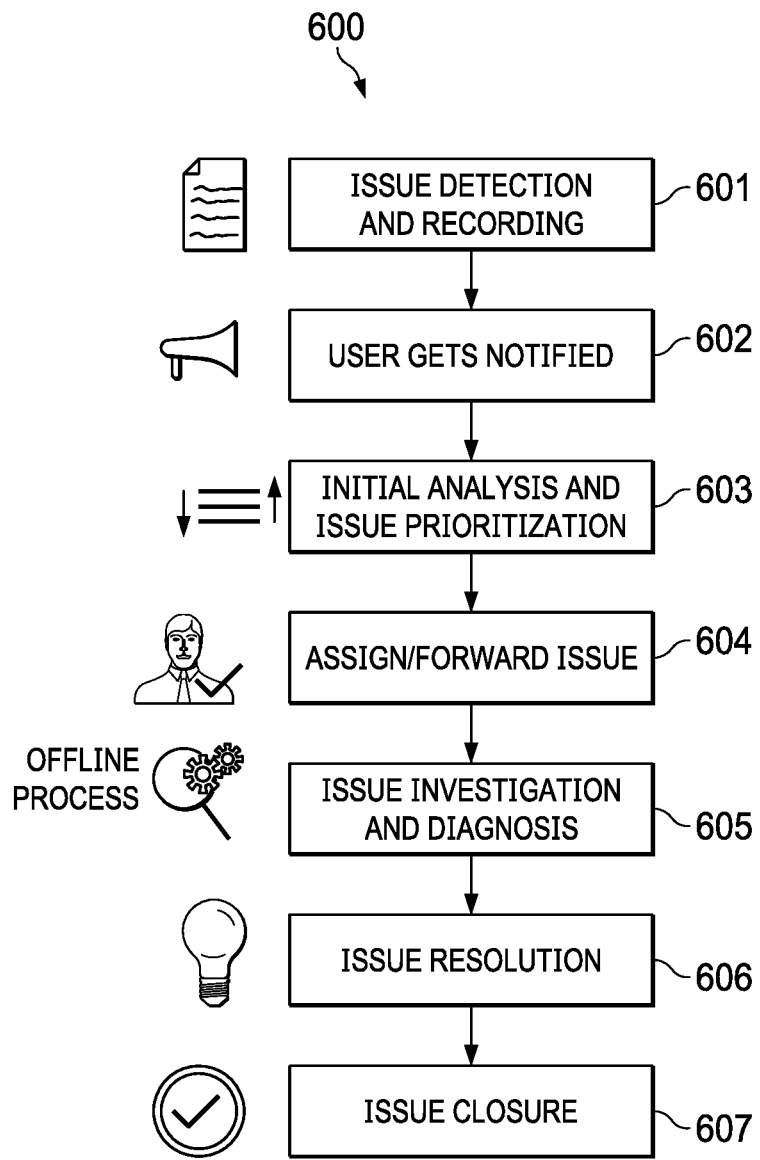
FIG. 6 is a flow diagram for an issue detection and resolution process, according to an embodiment.

FIG. 6 is a flow diagram issue detection and resolution, according to an embodiment. MSP 101 provides issue management tools in user dashboards that enable users to see a list of issues that is automatically generated by MSP 101 based on incidents that occurred during OTA operations. Issue management ensures that each issue is identified, analyzed, prioritized and resolved within an appropriate time frame so that OTA operations are not negatively impacted.

Referring to FIG. 6, process 600 begins when an issue is detected and recorded (601). For example, the mobility client may report an update failure to MSP 101. The issue can be viewed on a dashboard with, for example, the following screen fields: Issue ID, Issue Name, Issue Type, Issue Category, Reason, Assigned/To, Resolved By, Created Time, Priority, Status and Last Comment. Other embodiments of dashboards may include more or fewer screen fields.

The CM is notified of the issue (602), performs a preliminary analysis of the issue and assigns a priority to the issue based on the preliminary analysis (603). The priority determines the urgency of the issue so that users know which issue to solve first. In an embodiment, a High priority is assigned for critical issues that have a high impact on OTA operations, and have the potential to stop the OTA operations completely. A Medium priority is assigned to issues that have a noticeable impact on OTA operations, but will not stop the OTA operations from performing. A Low priority is assigned to issues that do not affect critical OTA operations, and do not have a negative impact on OTA operations if not resolved immediately.

After assigning a priority, the CM then assigns/forwards the issue to another user based on the type of issue detected (604). For example, if it is a deployment problem the SA will assign/forward the issue to the DM. If it is an installation issue, the CM will assign/forward the issue to the DM. If data analysis is required, the CM will assign/forward the issue to a data analyst. The assignee user will be notified of the assignment. The user can view the issue from their dashboard and assign/forward to another user if applicable. The user can also add comments to a comment section for the issue as a way to record additional detail about the issue, and collaborate with other users.

Once assigned the assignee will perform a more rigorous investigation of the issue and provide a diagnosis (605). The diagnosis is applied and if the issue is resolved (606) the issue is closed (607). After the issue is resolved, the user can change the status field of the issue from "In Progress" to "Resolved."

Example Data Analysis Tools

Figure 7:
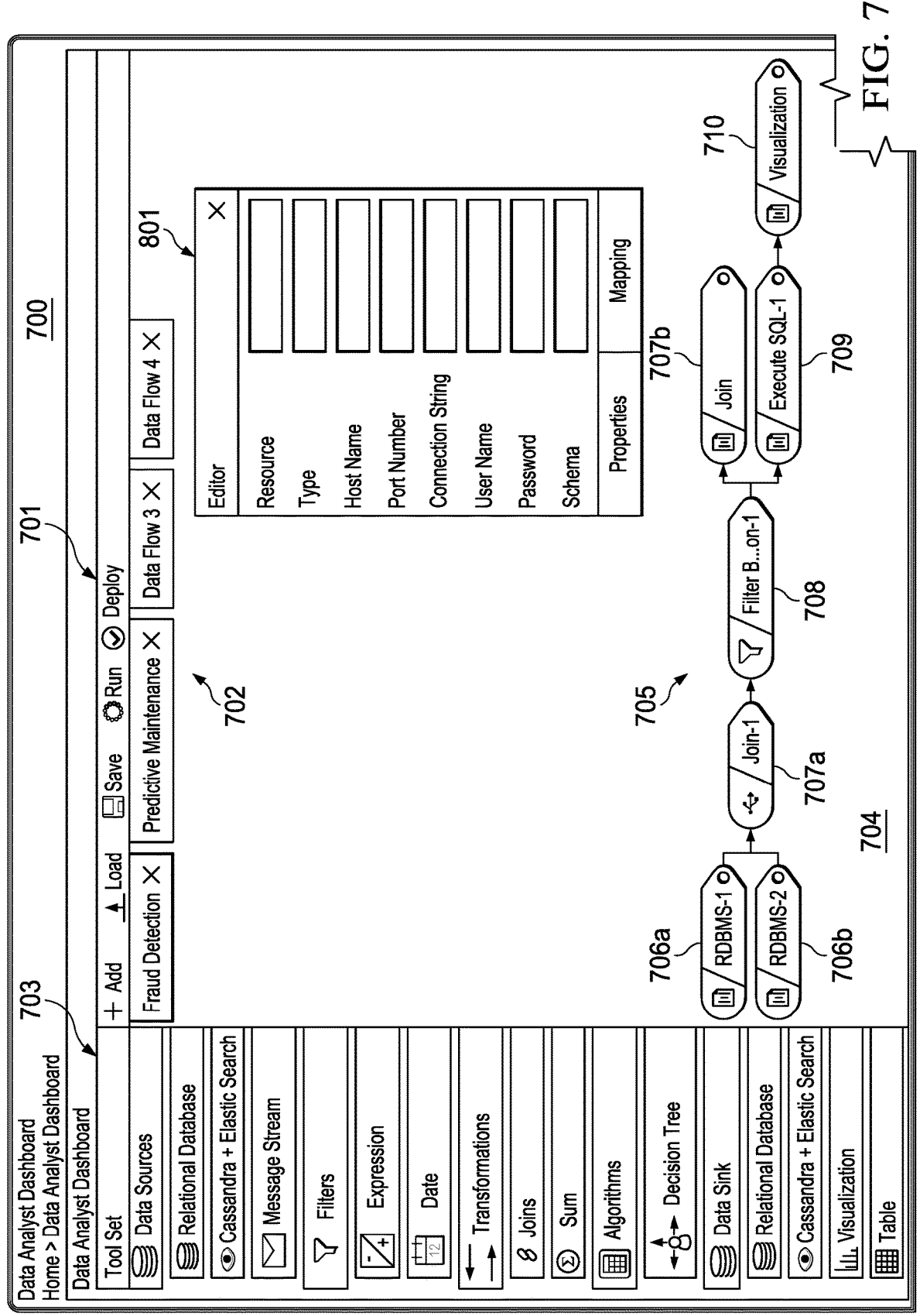
FIG. 7 illustrates a data analyst dashboard, according to an embodiment.

FIG. 7 illustrates a data analyst dashboard 700, according to an embodiment. Dashboard 700 can be invoked on MSP 101 by a data analyst. Dashboard 700 includes function bar 701, tab control 702, tool set 703 and workflow canvass 704. Dashboard 700 enables the data analyst to create a distributed workflow by dragging 'n dropping workflow objects listed in tool set 703 onto workflow canvass 704, configure properties and perform mappings for the workflow objects (See FIGS. 8A-8F), save the workflow, run the data workflow, deploy the workflow and select and load previously added workflows.

In the example shown, distributed workflow 705 for fraud detection was created and saved by the data analyst, as indicated by the fraud detection tab of tab control 702. Each workflow created by the data analyst can be saved as a tab with a user-specified name so that it can be accessed later using tab control 702. Function bar 701 includes various functions including Add, Load, Save, Run and Deploy. In the example shown, the workflow named Fraud Detection has been loaded.

Workflow 705 includes data source objects 706a, 706b, which in this example represent two relational database management systems RDBMS-1 and RDBMS-2. Data source objects 706a, 706b feed into a first join object 707a, creating a single stream of data, which is then output to filter object 708. Filter object 708 is configured to filter out data from the data stream. The output of filter object 708 feeds into a second join object 707b and executor object 709, which executes an algorithm or a state machine selected or developed by the data analyst. The output of executer object 709 feeds into visualization object 710, which generates a chart or table of the workflow output.

Some examples of data sources include but are not limited to: relational databases, No SQL-based databases (e.g., Cassandra™+Elasticsearch™) and message streams (e.g., Kafka® message stream). The properties editor tab 801 of a data source editor shown in FIG. 7 is used to configure properties of a data source, as described more fully in reference to FIG. 8A.

Some examples of filters include but are not limited to: range filters that limit data to a range of contiguous values, date filters that use calendar controls to adjust time or date selections to select a single contiguous range of dates or use a date range filter to exclude dates within a specified range and expression filters. Expression filters let the data analyst define more complex filters using SQL expressions.

Some examples of transformation include but are not limited to: a sum transformation that sum up values having numeric data types in a column of a database schema, and a join transformation that provides an output that is generated by joining two datasets using a FULL, LEFT or INNER join.

Some examples of executors include but are not limited to algorithms and state machines. In the example shown, a decision tree algorithm was selected to classify categorical data based on attributes. Any desired data mining, machine learning and statistical learning algorithms can be used as an executor, including but not limited to: simple linear regression, multiple linear regression, decision tree regression, random forest regression, gradient boosted tree regression, logistic regression, polynomial regression, linear discriminant analysis (e.g., Bayes' Theorem), resampling methods, support vector machines, unsupervised learning, supervised learning (e.g., neural networks).

Some example of data sinks include but are not limited to: relational databases, No SQL-databases, visualizations (e.g., charts, scatter plots, 3D mesh surfaces) and tables. When the data sink is a visualization the data analyst can view the workflow output in the form of visualizations or in the form of tables.

Figures 8A, 8B:
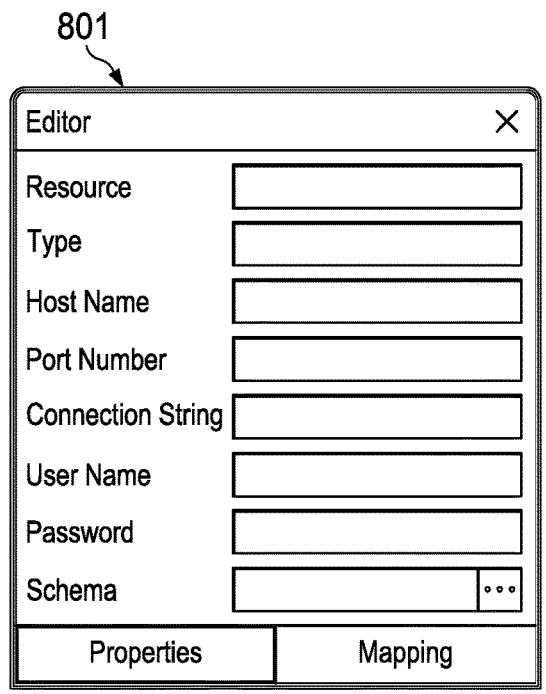
FIG. 8A illustrates a properties pane of a data source object, according to an embodiment.
FIG. 8B illustrates a mapping pane of the data source object, according to an embodiment.

FIG. 8A illustrates properties editor tab 801 of a data source editor, according to an embodiment. Properties editor tab 801 allows the data analyst to specify a resource, resource type, host name, port number, connection string, user name, password, and then select a data schema from a plurality of data schemas. FIG. 8B illustrates map editor tab 802 of the data source editor, according to an embodiment. When the data analyst selects map editor tab 802, the data analyst can select a database schema, tables and columns.

FIG. 8C illustrates properties editor tab 803 of a filter editor, according to an embodiment. The data analyst can use properties editor tab 803 to select a filter (e.g., range, date or expression). In this example, a filter expression is selected. FIG. 8D illustrates map editor tab 804 of the filter editor, according to an embodiment. The data analyst can use map editor tab 804 to set up the filter expression using conditional logic expressions. In the example shown, the data analyst created the conditional expression: if [Column 1]<10000 then "True" else "False." This filter expression will cause the filter output to be "True" if there are more than 10,000 items in Column 1 of a database table. Otherwise, the filter output will be "False."

Figure 8F:
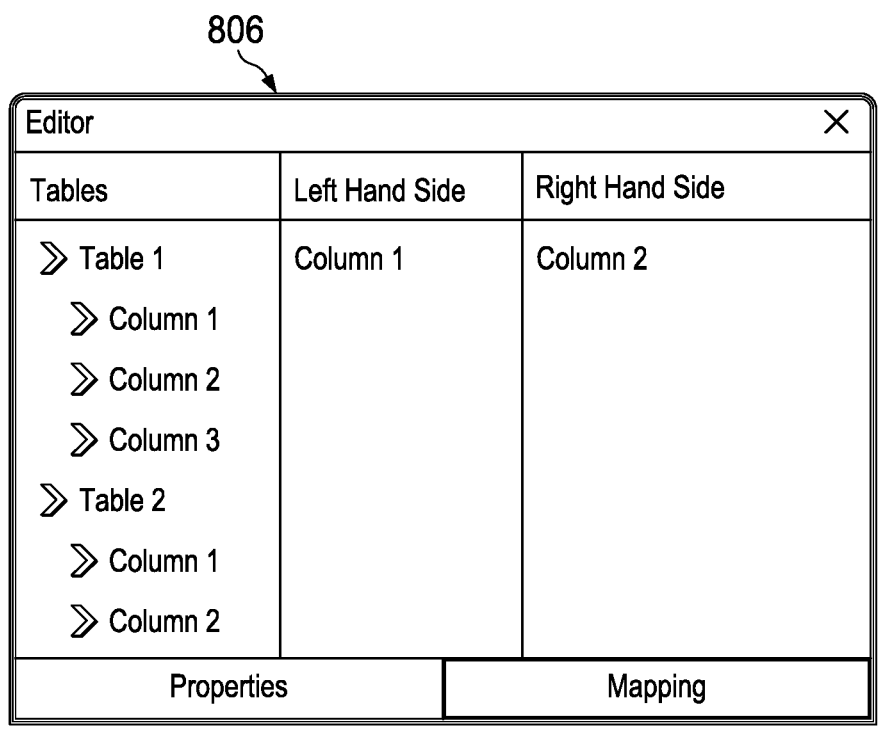
FIG. 8F illustrates a mapping pane of the join object, according to an embodiment.

FIG. 8E illustrates properties editor tab 805 of a transformation editor, according to an embodiment. The data analyst can use properties editor tab 805 to select a transformation (e.g., sum, join). FIG. 8F illustrates map editor tab 806 of the transformation editor, according to an embodiment. The data analyst can use map editor tab 806 to set up a join expression. For example, the data analyst can select columns from the respective tables and drop them in either "Left Hand Side" or "Right Hand Side" to make a join.

Example Data Mining Tools

Figure 9A:
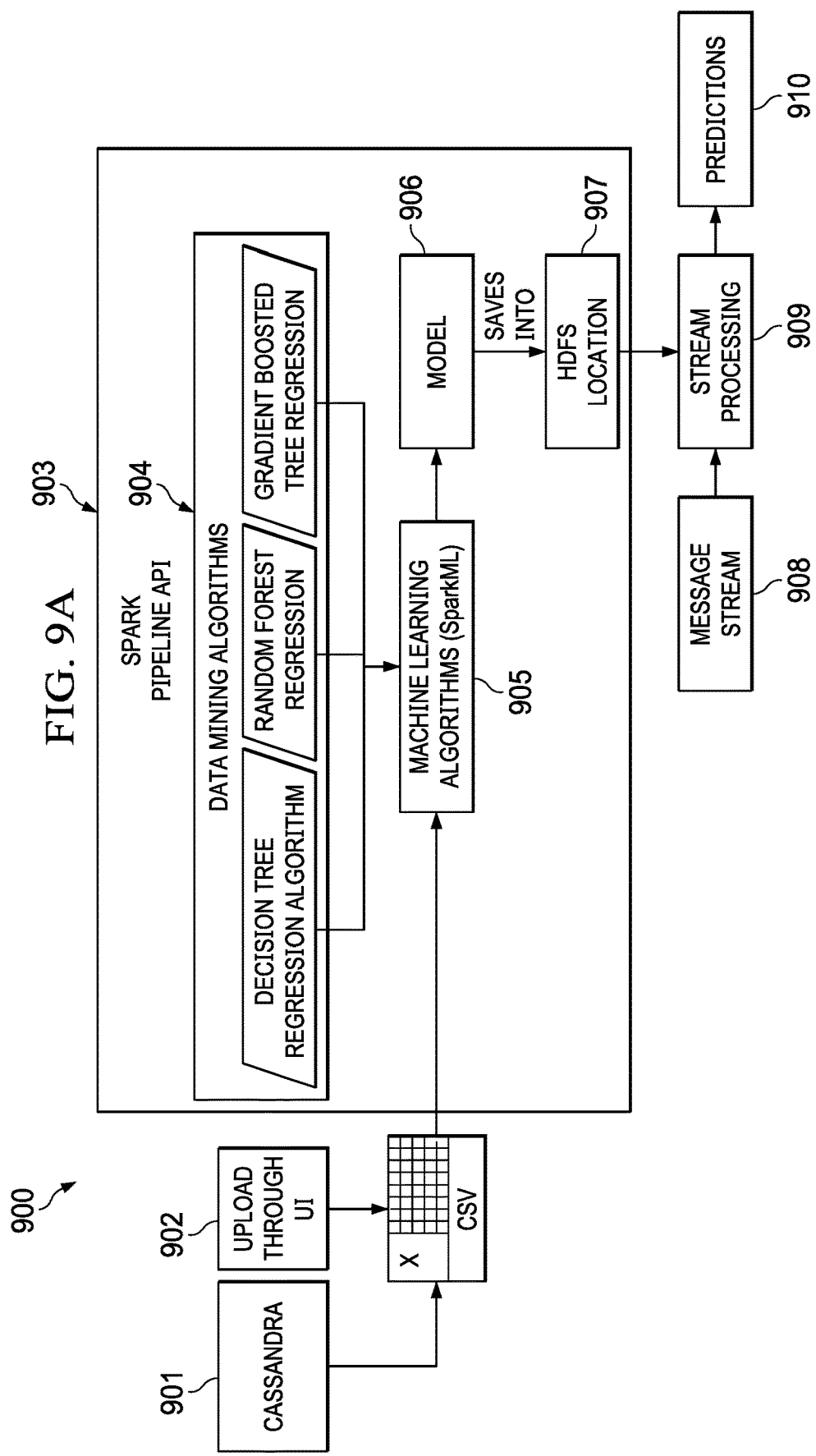
FIG. 9A is a flow diagram of a data mining process for generating a model using a machine learning algorithm, according to an embodiment.

FIG. 9A is a flow diagram of data mining process 900 for generating a model using a machine learning algorithm, according to an embodiment. Data mining is the process of extracting hidden and useful information from raw data by utilizing statistics, Artificial Intelligence (AI), machine learning (ML) techniques and smart algorithms. It also involves finding frequent patterns, associations and correlations among the data elements using ML algorithms.

Referring to FIG. 9A, data from data warehouse 901 (e.g., No SQL-based database) or data uploaded by system clients 902 are input into data analytics pipeline 903. Data analytics pipeline 903 can be implemented using an Apache Spark™ data pipeline architecture, and the input data can be in comma-separated value (CSV) format.

Data analytics pipeline 903 includes data mining algorithms 904, machine learning algorithm 905, model 906 and file system 907 (e.g., a Hadoop distributed file system). The input data is processed by machine learning algorithm 905 using one or more data mining algorithms 904. The output of machine learning algorithm 905 is model 906, which is saved in file system 907. Model 906 is then used by stream processing module 909 to process message stream 908 (e.g., a Kafka™ message stream) to provide predictions 910 (e.g., predictive maintenance).

In the example shown, data mining algorithms 904 are regression algorithms, including decision tree regression, random forest regression and gradient boosted tree regression, respectively. Machine learning algorithm 905, however, can utilize any known data mining algorithm, including but not limited to: decision trees, naïve Bayes' classification, ordinary least squares regression, logistic regression, support vector machine (SVM), clustering algorithms (e.g., k-means), principal component analysis (PCA), singular value decomposition (SVD), independent component analysis (ICA), etc. In an embodiment, the machine learning algorithm is implemented using Apache Spark ML™.

Figure 9B:
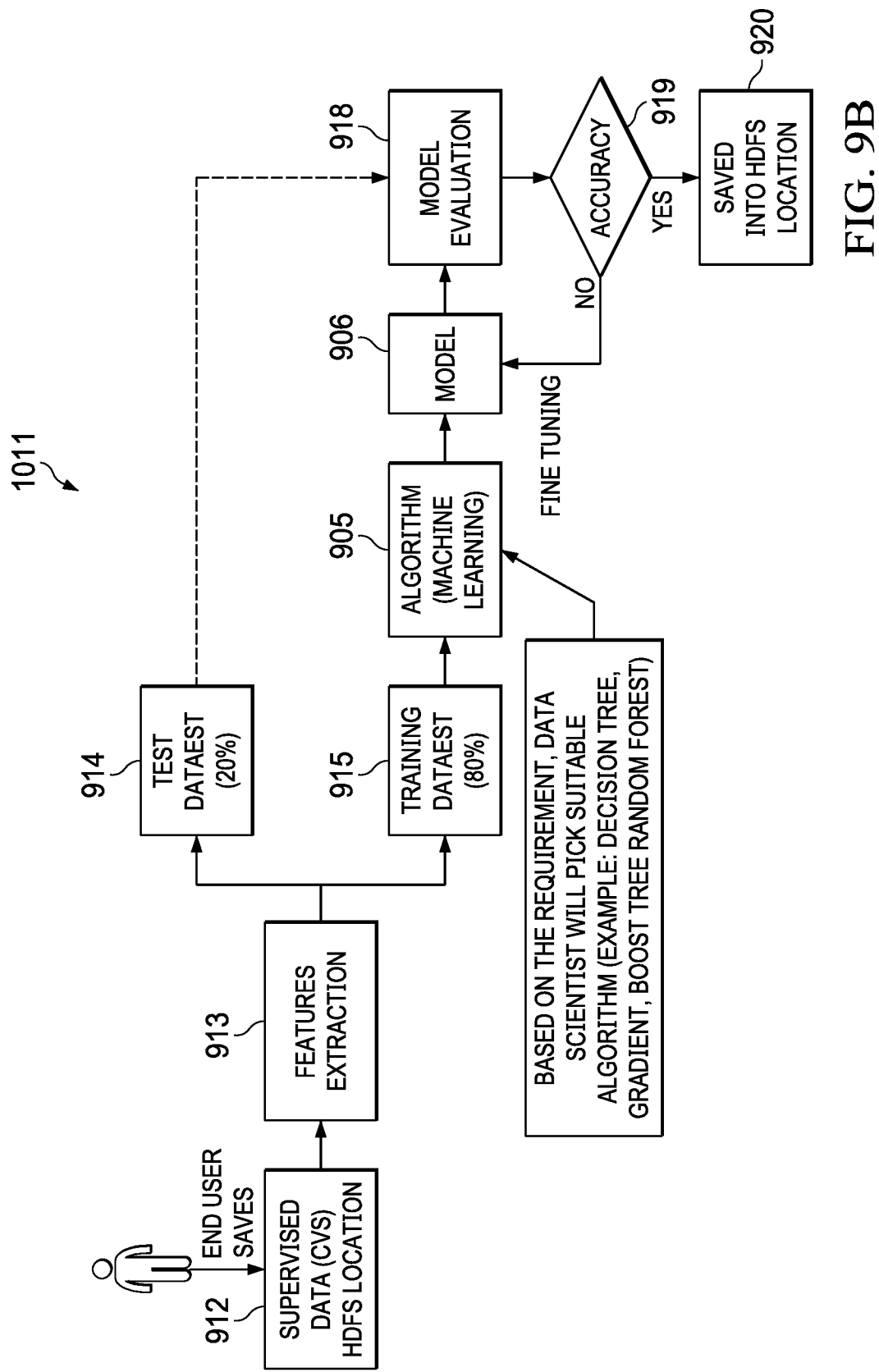
FIG. 9B is a flow diagram of a process for training and evaluating a model, according to an embodiment.

FIG. 9B is a flow diagram of a process for training and evaluating model 906, according to an embodiment. Supervised data can be retrieved from file system 912 and input into feature extraction module 913. Feature extraction module 913 selects relevant features (variables, predictors) for use in constructing model 906. A percentage (e.g., 20%) of the features form test dataset 914 and the remaining features (e.g., 80%) form training dataset 915. Training set 914 is input into machine learning algorithm 905 to train model 906. The output of model 906 is input into model evaluation module 918, where it is evaluated against test dataset 914. If a desired accuracy is reached 919, model 906 is saved in file system 920. If a desired accuracy is not reached 919, the parameters of model 906 are adjusted, and the output of model 906 is evaluated again by model evaluation module 918.

Example Predictive Maintenance

Figure 10A:
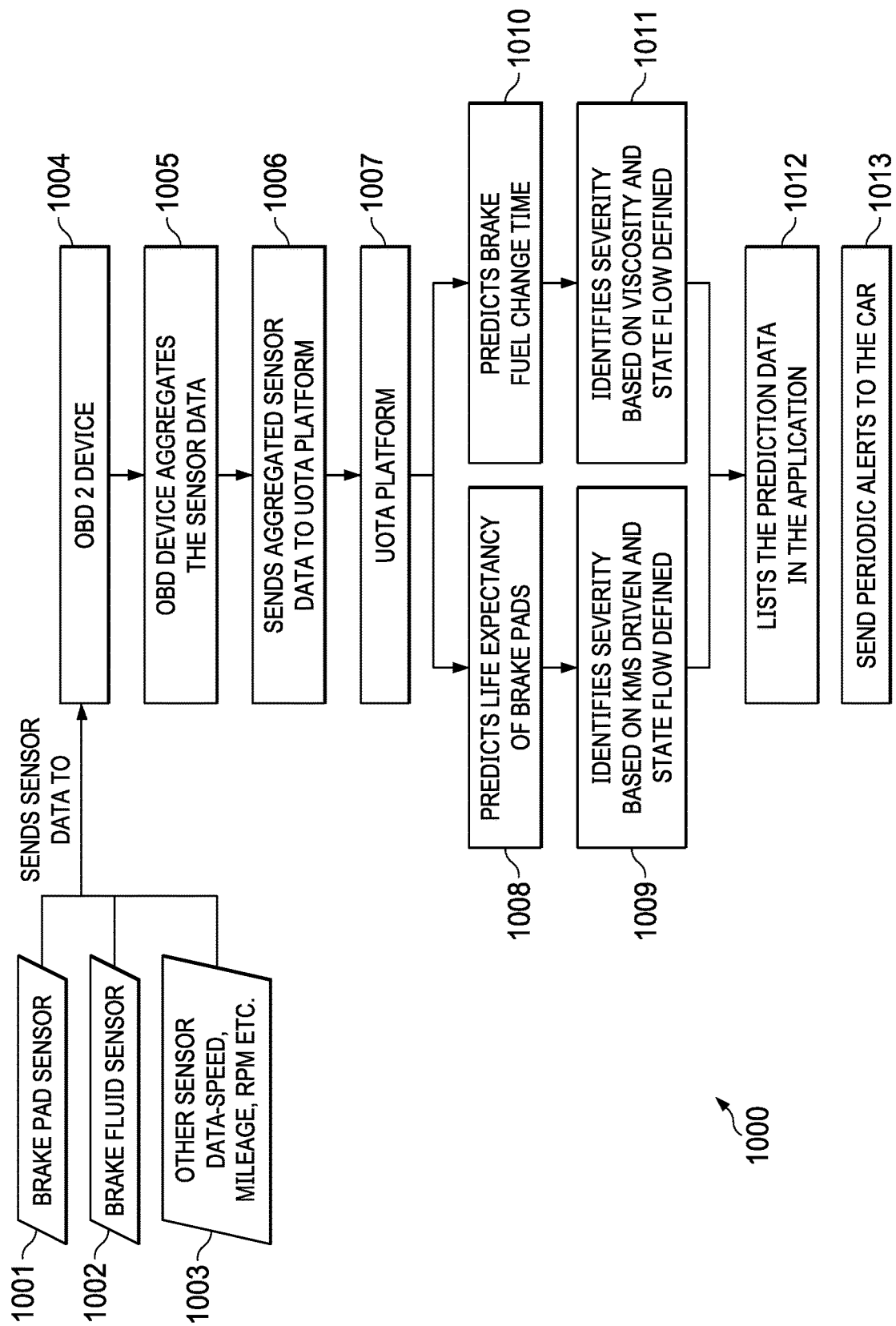
FIG. 10A is a flow diagram of a predictive maintenance process for a vehicle brake system, according to an embodiment.

FIG. 10A is a flow diagram of a predictive maintenance process for a vehicle brake system, according to an embodiment. A vehicle owner/driver needs to know when to replace the brake pads or brake fluid so that they do not have an accident or destroy the brake rotor, which is the metal part of the brake assembly. If they wait too long the brake pad will destroy the rotor as metal rubs up against metal. The driver cannot be expected to check the brakes each time the vehicle has stopped for brake pad wear and fluid levels. And if the driver changes the brake pads or brake fluid based on some preset schedule then they may be wasting money because they might be changing the brake pads and fluid too often. It is preferred to implement a model that can predict when the brake pads or brake fluid should be changed.

Predictive maintenance techniques area designed to help determine the conditions of in-service mobility clients to predict when maintenance, such as brake system service, should be performed. Predictive maintenance provides cost savings over routine or time-based preventive maintenance at least because maintenance is performed only when warranted. Predictive maintenance employs monitoring and prediction modeling to determine the condition of a mobility client and to predict if a component is likely to fail and when.

In the example shown, the mobility client is a vehicle and it is assumed that the vehicle is equipped with an Onboard Diagnostic (OBD) device and that the OBD device streams real-time data. The real-time data is sent through an OBD port and includes vehicle speed, revolutions per minute (RPM), air temperature and readings from various sensors.

Referring to FIG. 10A, brake pad sensor data 1001, brake fluid sensor data 1002 and other sensor data 1003 (e.g., speed, mileage, RPM) are sent to OBD device 1004 installed on the vehicle. OBD device 1004 aggregates the sensor data (1005) and sends it to MSP (1006). Brake pad sensor data 1001 is input into a data analytics pipeline created by a data analyst as described in reference to FIGS. 7 and 8, which predicts a life expectancy of the brake pads (1008). A severity level (e.g., High, Medium, Low and Optimal) for the brake pad wear is determined based on the prediction results and a defined state flow (1009). Similarly, brake fluid sensor data 1001 is input into the data analytics pipeline, which predicts a brake fluid change time (1010). A severity level for the brake fluid level is identified based on the prediction and a defined state flow (1011). The sensor data, predictions and severity levels are stored with other vehicle details in a data repository (1012). Based on the severity level, operation engine 204 (FIG. 2) can generate one or more visualizations and/or alerts (visual or audio) to send to the vehicle or to a system client (e.g., an OEM). The visualizations and/or alerts can be presented to the user on a vehicle dashboard as a warning light, displayed on computer screen and/or played through a loudspeaker. Some examples of alerts include "Time to Failure" and "Recommended Maintenance Time."

Figure 10B:
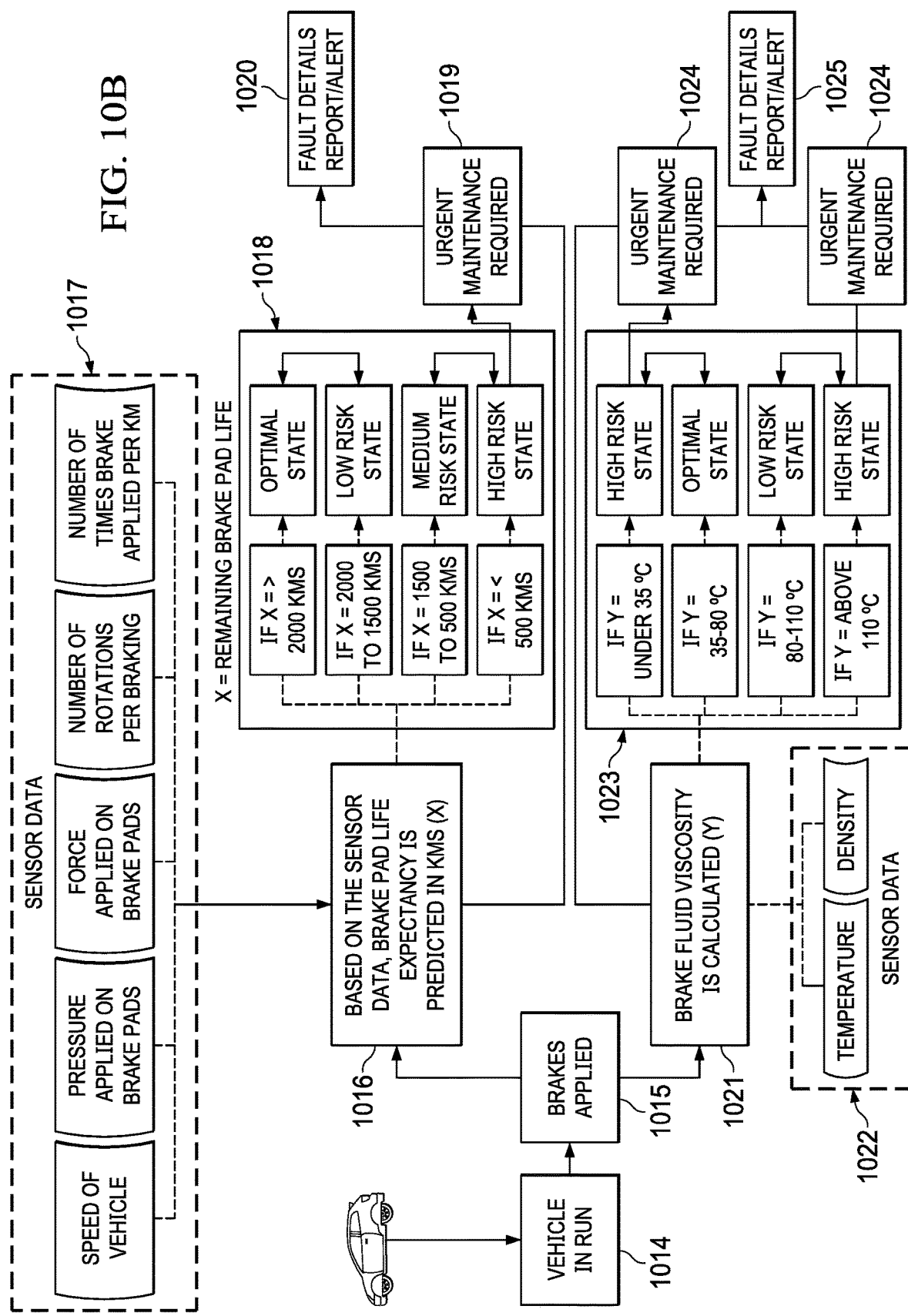
FIG. 10B is a more detailed flow diagram of a predictive maintenance process for a vehicle brake system, according to an embodiment.

FIG. 10B is a more detailed flow diagram of a predictive maintenance process for a brake system, according to an embodiment. Brake pads are the component in the braking system that provides the friction to slow the vehicle. They are located in the brake calipers and function by pressing against the disc brake rotors with friction material to slow and stop the wheels. As they are a contact wear item, the brake pads will eventually wear out over time and need to be replaced.

Predicting Brake Pad Life Expectancy

To compute brake pad life expectancy, we assume that values below are sent to MSP 101 as part of the OBD data.

Force on Brake Pads=500 N (System to calculate average force of brake pads)

Force applied by the brake pad on the rotor (F)=93.545 KN

Surface area of contact of brake pad (A)=5445.414 mm

Pressure Applied on the brake pad (P)=F/A=93.545/5445.414=17.178 Mpa

Coefficient of friction between rotor and pad ($\mu$)=0.45

Braking torque applied by the pad on the rotor (T)=5519.188 Nm

Radial distance of point of application of equivalent force (R)=131 mm

Modifying factor dependent on motion type, load a speed (F1)=1.8

Environmental factor, accounts for temperature & cleanliness conditions (F2)=1

Wear factor (K)=1.3*10 mm/Nm

Number of rotations under maximum load braking which will lead to 1 mm of pad thickness to wear out (ΔT)=1 mm Based on the above values, the system will compute the wear thickness ΔT according to Equation [3]:

$$\Delta T = F1 * F2 * K * P \times R * 2\pi N \quad [3]$$

By applying the above values to Equation [3], we get N=30000 rotations, which means the brake pads will last for more than 30 thousand rotations under full load braking (500N). Now let's assume the values below are also sent as part of the OBD data.

Diameter of the wheel (D)=547. mm

Circumference of wheel (C)=1.7 m

Speed of the Vehicle (S)=50 KMPH

Braking distance of a car from 50 kmph to zero (B)=4 meters

Number of rotations per braking, n=B/c=4/1.7=2.35=2.5 (Round off)

No. of times brakes applied per kilometer=2

Based on these additional values, the life of the brake pad L is given by Equation [4]:

$$L = N/(2*n). \quad [4]$$

Applying the values above (30000/2*2.5)=6000 KMS of vehicle travel. Now that we know the life expectancy of the brake pads, we can now define the state flows and their related alerts as shown in Tables 1 and 2, respectively.

TABLE 2

State Flow Definition

| Types | Life Expectancy (KMS) | State 1 | State 2 | State 3 | State 4 |
|---|---|---|---|---|---|
| Brake Pads | 6,000 (per prediction) | >2500 | 1500-2500 | 500-1500 | <500 |

TABLE 3

Severity and Alerts

| State | State Flow Name/Severity | Alert |
|---|---|---|
| State 1 | Optimal | No Alert |
| State 2 | Low | No Alert |
| State 3 | Medium | No Alert |
| State 4 | High | Alert |

Based on the usage of the brake pads, the life expectancy of the brake pads may move back and forth across states. An occurrence is the total number of times the states toggle between Optimal to High and High to Optimal, as shown in the Example of Table 3.

TABLE 3

Occurrence Example

| State | Severity | No. of Times Identified |
|---|---|---|
| State 1 | Optimal | 2 |
| State 2 | Low | 4 |
| State 3 | Medium | 6 |
| State 4 | High | 8 |
| Total Number of Occurrences | | 20 |

The "time to failure" of the brake pads specifies the time remaining for the complete failure of the part or the component. Time is specified in days and it is predicted based on the average kilometers/miles driven for each day. For example, if the life expectancy of the brake pads is predicted as 6000 KMS, and the average kilometers driven in a day is 100, then the recommended maintenance time will be 6000/100=60 days. Table 4 shows recommended maintenance times for this example.

TABLE 4

Recommended Maintenance Times (Brake Pads)

| Time to Failure | Recommended Maintenance Time |
|---|---|
| <30 days | Immediate |
| 30 days and <60 days | In next 15 days |
| 60 days and <90 days | In next 30 days |
| >=90 days | NA |

Predicting Brake Fluid Change

Brake fluid is a type of hydraulic fluid used in hydraulic brake and hydraulic clutch applications in automobiles, motorcycles, light trucks, and some bicycles. It is used to transfer force into pressure, and to amplify braking force. In regular maintenance activities, fluid is changed based on the number of kilometers/miles driven but not on the viscosity of the fluid. Through predictive maintenance, actual viscosity level of the brake fluid can be monitored and change of brake fluid can be predicted. Viscosity index and classification is shown in Table 5 below:

TABLE 5

Viscosity Index and Classification

| Viscosity Index | Classification |
|---|---|
| Under . | Low |
| 35 to 80 | Medium |
| 80 to 110 | High |
| Above 110 | Very High |

Too low of viscosity may cause increased metal-to-metal contact, increased friction and wear, increased oil consumption and leaking seals. Too high of viscosity may cause increased fluid friction, increased operating temperatures and reduced energy efficiency. Tables 6 and 7 provide a state flow definition and severity and alerts, respectively, for brake fluid.

TABLE 6

State Flow Definition

| Types | Life Expectancy (KMS) | State 1 | State 2 | State 3 | State 4 |
|---|---|---|---|---|---|
| Brake Fluid | NA | <35° C. | 35-80° C. | 80-110° C. | >110° C. |

TABLE 7

Severity and Alerts

| State | State Flow Name/Severity | Alert |
|---|---|---|
| State 1 | Optimal | Low Viscosity |
| State 2 | Low | No Alert |
| State 3 | Medium | High Viscosity |

Based on the usage of the brake, the life expectancy of the brake fluid may move back and forth across states. An occurrence is the total number of times the states toggle between Low to High and High to Low, as shown in the Example of Table 8.

TABLE 8

Occurrence Example

| State | Severity | No. of Times Identified |
|---|---|---|
| State 1 | Low | 2 |
| State 2 | Medium | 4 |
| State 3 | High | 6 |
| Total Number of Occurrences | | 12 |

The recommend maintenance time specifies the predicted time or distance (KMS) remaining for the complete failure of the part or component. Table 9 shows recommended maintenance times for this example.

TABLE 9

Recommended Maintenance Times (Brake Fluid)

| State | Severity | Recommended Maintenance Time |
|---|---|---|
| State 1 | Low | Immediate |
| State 2 | Medium | NA |
| State 3 | High | Immediate |

FIG. 10B is a more detailed flow diagram of a predictive maintenance process for a vehicle brake system, according to an embodiment. When the vehicle is running (1014) and brakes are applied (1015), brake pad life expectancy is predicted (1016) based on sensor data 1017. Sensor data 1017 includes but is not limited to: speed of the vehicle, pressure applied on the brake pads, force applied on the brake pads, number of rotations per braking and number of times brakes are applied per KM. Failure analysis is then performed on the predicted remaining brake pad life X to determine the state of the brake pads (1018). If there is a high risk state then urgent maintenance is required (1019), and a report including the failure details is generated (1020) and/or an alert is sent to the operator of the vehicle, a system client or other interested party with authority to access the report or receive the alert.

When vehicle is running (1014) and brakes are applied (1015), brake fluid viscosity is calculated (1021) based on sensor data 1022. Sensor data 1022 includes but is not limited to: temperature and fluid density. Failure analysis is then performed on the calculated viscosity Y to determine the state of the brake fluid (1023). If there is a high risk state than urgent maintenance is required (1024), and a report including the failure details is generated (1025) and/or an alert is sent to the operator of the vehicle, a system client or other interested party with authority to access the report or receive the alert.

The predictive maintenance described above for a single vehicle brake system can be applied to any vehicle component that is subject to failure or that requires replacement, such as tire pressure, balance, engine (e.g., spark plugs), transmission, battery, fuel system, fuel filter, cooling system, power steering fluid, oil change, oil filter, etc. Additionally, the predictive maintenance processes described above can use sensor data from a vehicle group rather than a single vehicle. For example, sensor data from a plurality of vehicles in a vehicle group (e.g., vehicles that have the same make, model, year, style and trim) can be maintained in a data repository and used to predict maintenance for the vehicle group and to establish statistical trends and baselines for the vehicle group. For self-driving vehicles, the predictive maintenance processes can predict when sensors (e.g., stereo camera, LiDAR, Radar, Sonar, accelerometers, gyroscopes) are failing or need to be recalibrated. The prediction maintenance processes can also be extended to predicting occurrences of events not related directly to vehicles, such as predicting a traffic jam based on sensor data collected from crowdsourcing a large number of vehicles that are traveling on a particular road or highway. Such predictions can be used to generate map tiles with traffic overlays (e.g., color coding routes), which can be sent to mobility clients when the mobility clients enter a specific geographic region or geofence (see, FIG. 5)

Figure 10C:
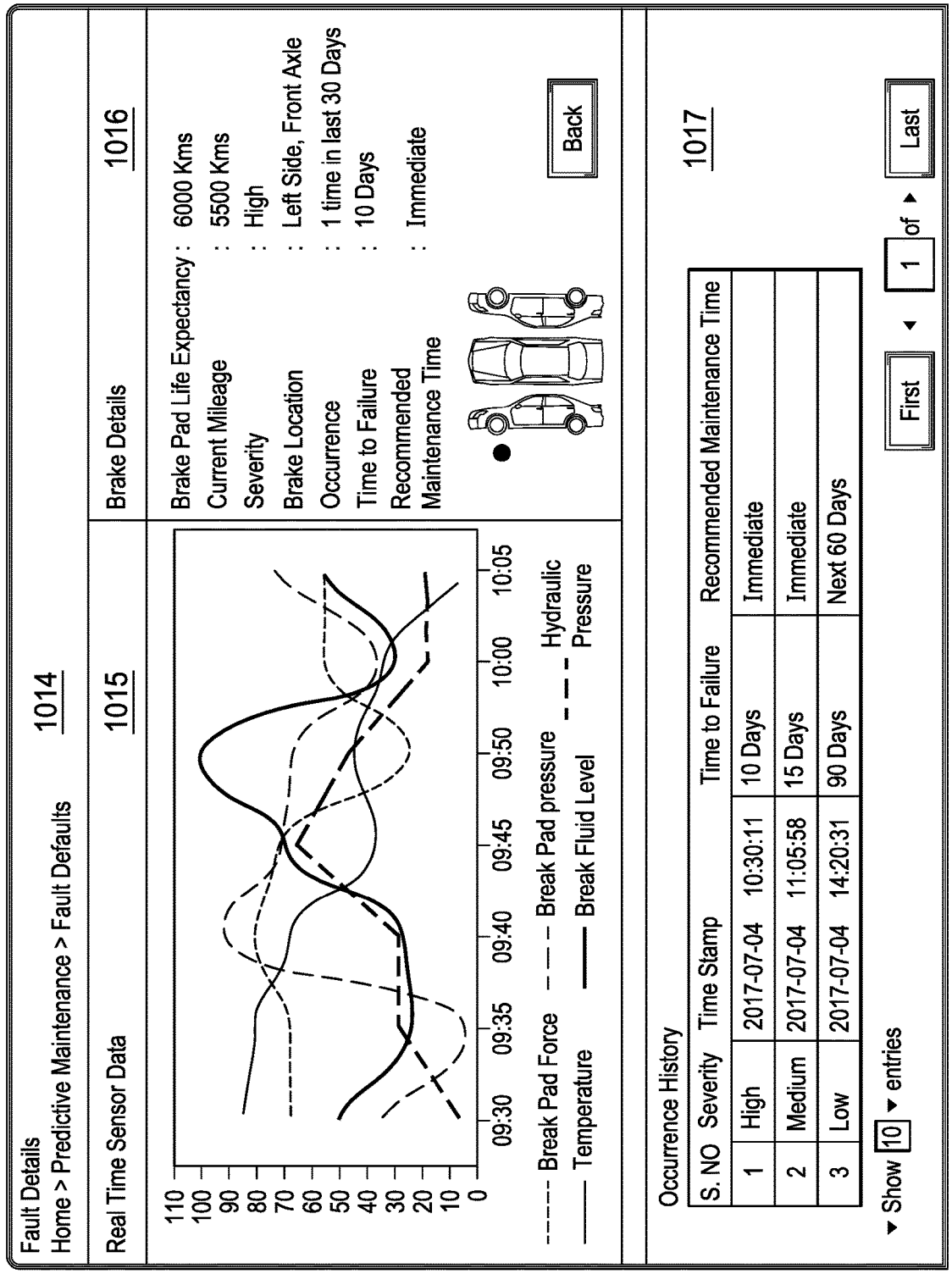
FIG. 10C is an example predictive maintenance report, according to an embodiment.

FIG. 10C is an example predictive maintenance report 1014, according to an embodiment. Report 1014 includes multiline chart 1015 of real-time sensor data, such as brake pad force, brake pad pressure, temperature, brake fluid level and hydraulic pressure. To the right of char 1015 is brake details 1016 including break pad life expectancy, current mileage, severity, brake location, occurrence, time-to-failure and recommended maintenance time. A graphic of the vehicle visually indicating the condition of each brake using a color coding scheme to indicate severity. At the bottom of report 1014 is occurrence history table 1017 including the occurrence number, severity, time stamp, time-to-failure and recommended maintenance time.

Figure 11A:
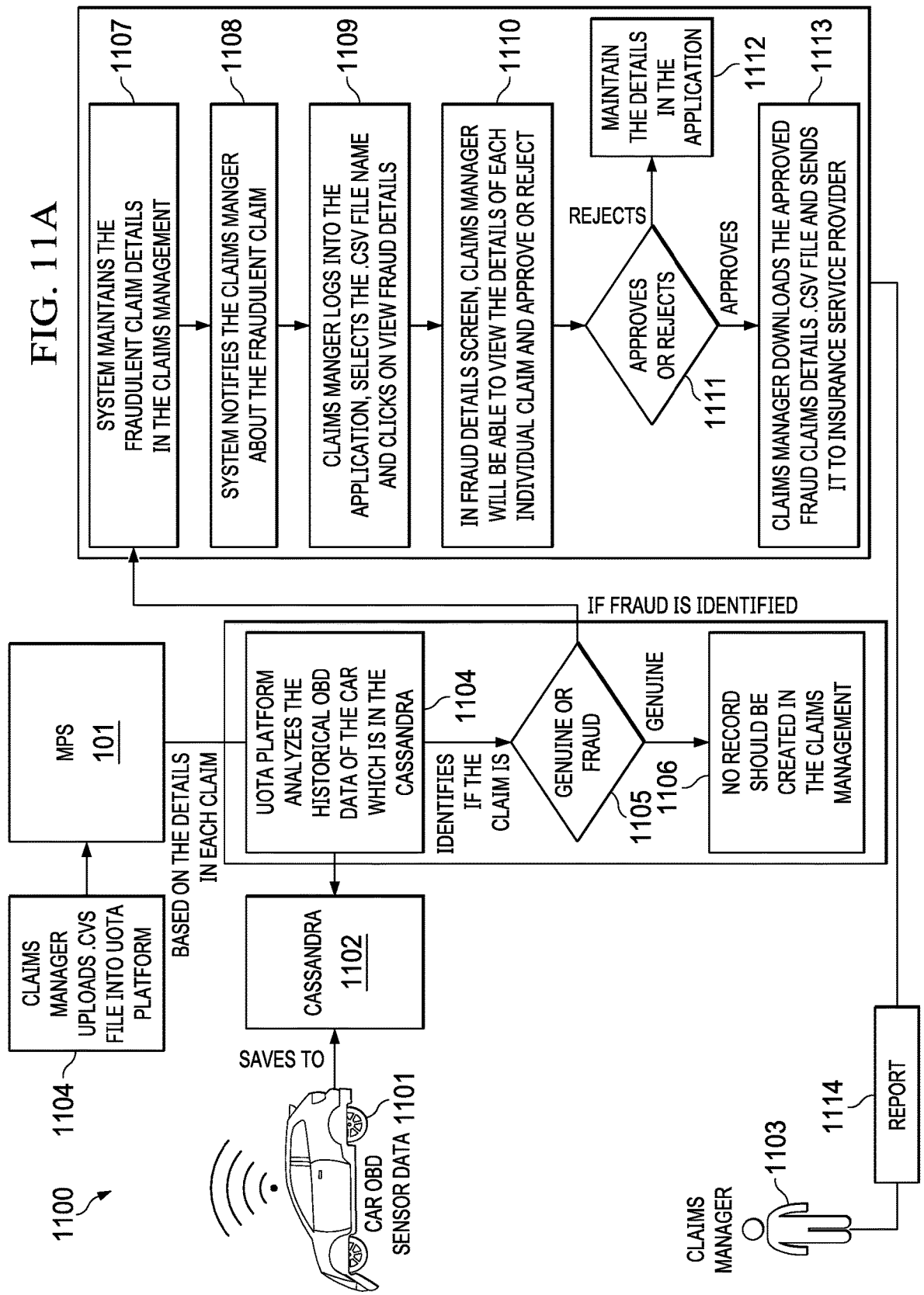
FIG. 11A is a block diagram of a claims management system, according to an embodiment.

FIG. 11A is a block diagram of claims management system 1100, according to an embodiment. Fraudulent activity costs the insurance industry billions of dollars annually and is a major reason why premium costs continue to increase, particularly in geographic areas prone to fraudulent risk. Whether it is "hard fraud" (e.g., staged accidents) or "soft fraud" (e.g., embezzlement), there are always indicators that suggest the potential for a high-risk claimant. These indicators are often subtle but, if discovered, can have a significantly positive impact on an insurer's bottom line. In this example, we assume each vehicle is equipped with an OBD device that can stream real-time data, and the insurance provider will send the claim details through the service API (See FIG. 2).

Vehicle 1101 streams sensor data which is saved into data repository 1102 (e.g., Cassandra™ database+Elasticsearch™) and historical sensor data is maintained. In a claims management dashboard (not shown), claims manager 1103 uploads the claim details to claims management system 1100 in the form of a .csv file (1104). The claim files uploaded are listed in the claims management dashboard. Based on the claim details uploaded, the brake related historical data for vehicle 1101 is retrieved from data repository 1102. An analysis is performed on the retrieved historical data (1104) to determine if the claim is fraud or genuine (1105). If the claim is determined to be genuine, no record is created in the claims management system (1106).

If the claim is determined to be fraud, the system maintains the claim details in the claim management system (1107). Claims manager 1103 is notified about the fraudulent claim 1108 (e.g., through e-mail notification, alert notification in the dashboard). Claims manager 1103 logs into claims management system 1100 and views the claim details (1109).

In the dashboard, the claims manager views the fraud analysis either approves or rejects the claim 1110). Based on the reason provided, the claims manager will decide to approve or reject the fraud (1111). If rejected, the claim details will be maintained in data repository (1112). If approved, claims manager 1103 downloads a fraud verification report 1114 with details of the fraud analysis (1113), and sends report 1114 to the insurance provider.

FIG. 11B is an example fraud verification report 1114, according to an embodiment. The fraud verification report described below is an example. Other formats can be used with more or viewer sections and details, including the additional of one or more visualizations (e.g., charts).

Report 1114 includes table 1115 listing the fraud claim records by claim ID, claim type, claim date and time and status (e.g., open, approved, rejected). When the claims manager clicks on a fraud claim record in table 1115, the details of the record populate the fields in indicator and readings table 1116. Table 1116 includes indicators (e.g., brake pedal force, deceleration peak, left to right brake imbalance, etc.). The actual readings, minimum readings, maximum readings and status (e.g., low, high, optimal) included in columns of table 1116. Certain key indicators 1117 are displayed prominently in report 1114 (e.g., engine load, engine temperature, RPM, speed). Section 1118 of report 1114 includes text fields for the claims manager to enter the result of her fraud analysis, and a comment section to enter her reasons for the result. In an embodiment, the fraud analysis is automated without user intervention. Section 1119 of report 1114 includes a comment section to enter rejection comments and buttons to approve or reject report 1114. Section 1120 of report 1114 displays a claim history including date, claim ID, claimant, claim (e.g., brake failure), fraud analysis result (e.g., Yes or No) and status (e.g., approved, rejected).

Figure 12:
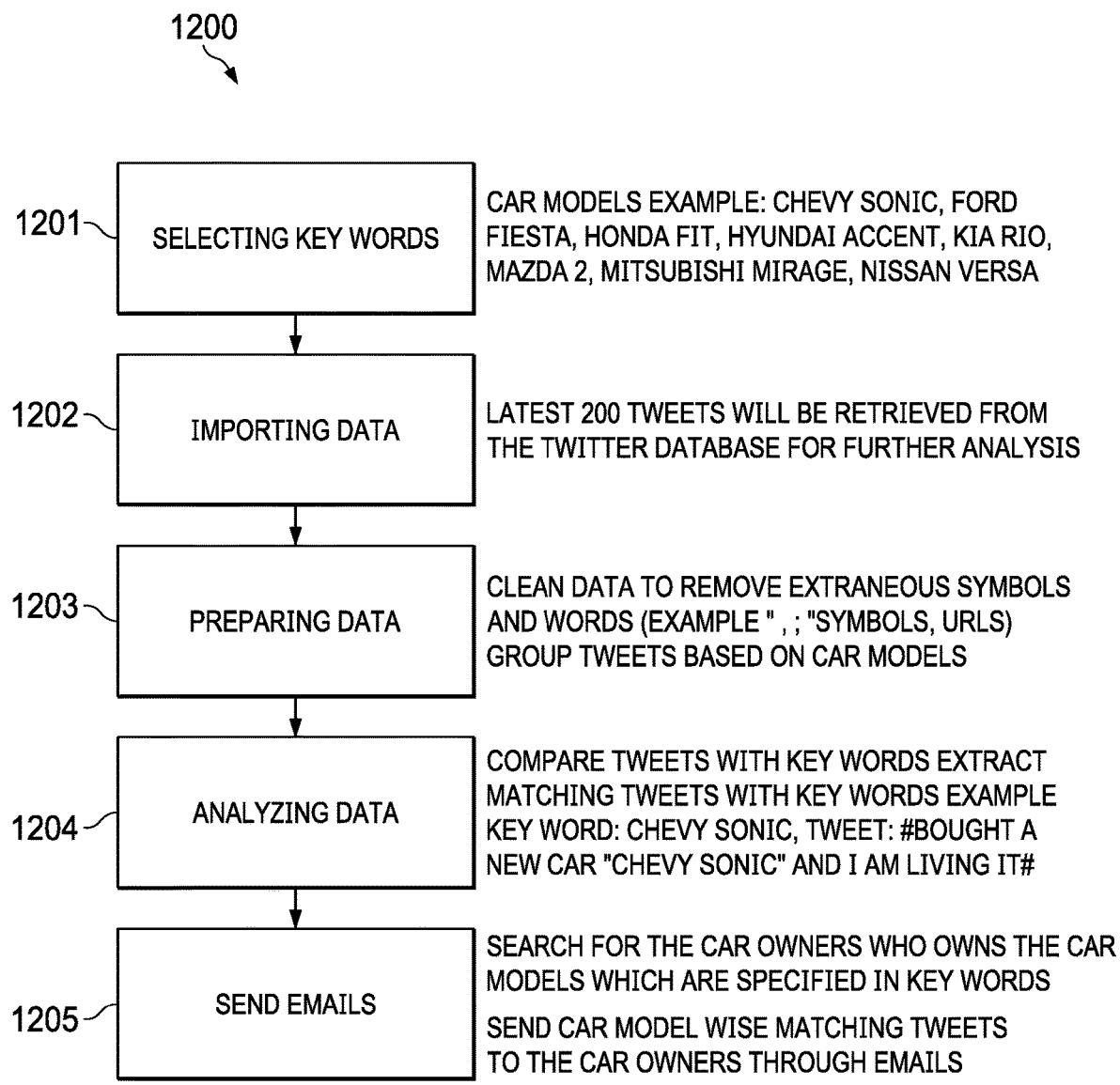
FIG. 12 is a flow diagram of a process for using social data for vehicle management, according to an environment.

FIG. 12 is a flow diagram of process 1200 for using social data for vehicle management, according to an environment. Social data refers to data individuals create that is knowingly and voluntarily shared by them on social medium platforms. Monitoring online customer conversations over social media like Facebook® and LinkedIn® can be used to capture first-hand information about the user, which can then be used to generate meaningful insights.

Process 1200 begins by selecting key words from social media (1201). For example, domain experts analyze a concept to be studied and identify appropriate key words and phrases related to the concept (e.g., synonyms/morphologic variants) for extraction key words from social media streams (e.g. Tweets) to create an analytic corpus of key words. For example, a concept can be vehicle models and the key words could be Chevy Sonic™, Ford Fiesta™, Honda Fit™, etc.

Process 1200 continues by importing data from the social media (1202). For example, the last N Tweets (e.g., 200) can be imported by searching the selected key words and phrases via Tweet import tools.

Process 1200 continues by preparing the data (1203) by removing extraneous symbols and words. For example, quotes, commas and semicolons can be removed from the data. Also, links can be removed (e.g., URLs). The cleaned Tweets can then be grouped based on vehicle models.

Process 1200 continues by analyzing the data (1204) by comparing the data with the key words and extracting words that match the key words. For example, a Tweet that reads #bought a new car "Chevy Sonic™" and I'm loving it# would match the key phrase "Chevy Sonic."

Process 1200 continues by searching for owners of vehicles that match the keywords or phrase and sends the owners a communication (e.g., email, text message, Tweet) that includes or quotes the Tweets matching the key words or phrase. For example, an email can be sent that reads:

"Hi [name],
    Below is a list of Tweets posted by people who own a
      Chevy Sonic™
    [Tweet 1]
    [Tweet 2],
    [Tweet 3]."

Example Security Processes

Figure 13:
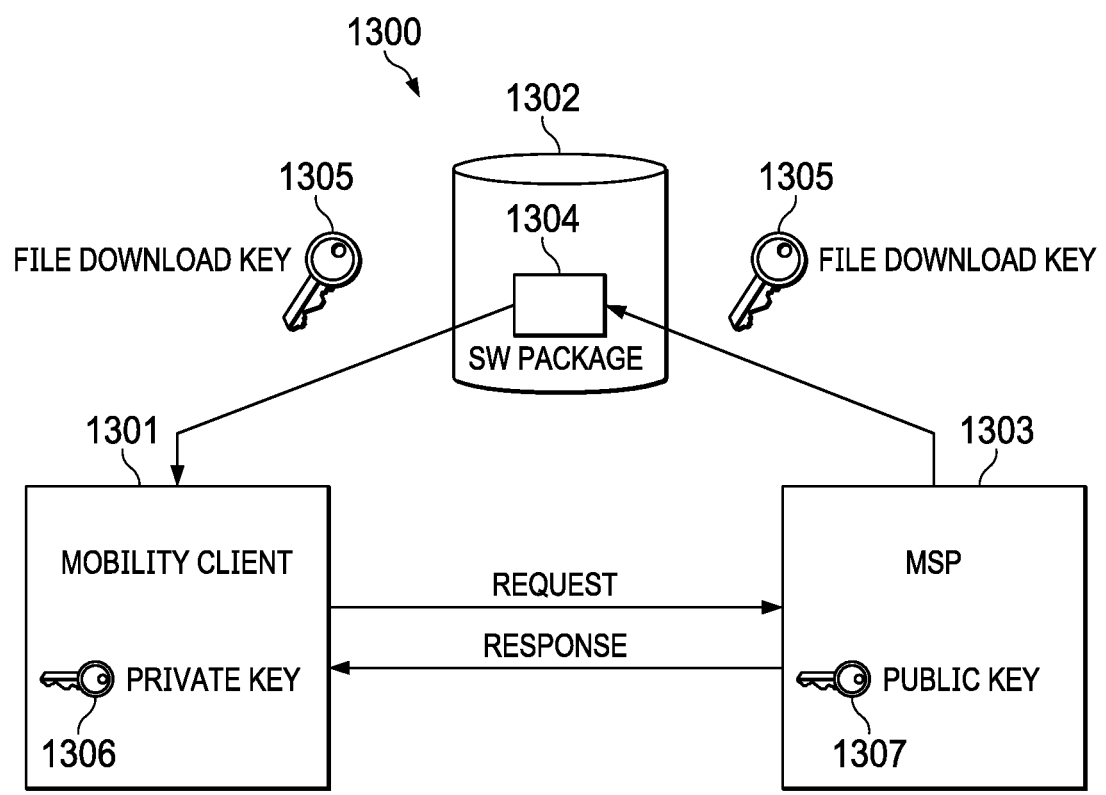
FIG. 13 illustrates a security process for software update package distribution, according to an embodiment.

FIG. 13 illustrates security process 1300 for software update package distribution, according to an embodiment. Security is a critical concern for OTA services. The server, the client and the downloaded software package need to be authenticated to avoid man-in-the-middle attacks. The default URL of MSP server 1303 is provided to mobility client 1301 and the root certificate is handled by HTTPS. To authenticate mobility client 1301, private key 1306 of mobility client 1306 is stored with mobility client 1306 and public key 1307 of mobility client 1301 is stored on MSP server 1303.

A message sent by mobility client 1301 contains an encrypted session token that it received from MSP server 1303 during a registration process. The message can be sent using JSON format. The session token is randomly generated by MSP server 1303 and it is unique per session. The session token is encrypted by mobility client 1301 with private key 1306 of mobility client 1301. MSP server 1303 decrypts the session token with public key 1307 of mobility client 1301, and if the session token matches the session token sent to mobility client 1301 during the registration process, mobility client 1301 is validated. The session token has an expiration date. If the session token is expired, mobility client 1301 requests a new session token from MSP server 1303.

Software package 1304 stored in data repository 1302 is encrypted with file download key 1305. File download key 1305 is sent to mobility client 1301 as part of the download information. Mobility client 1301 decrypts file download key 1305. Mobility client 1301 decrypts downloaded software package 1304 with file download key 1305.

Example Home Page with Visualizations

Figure 14:
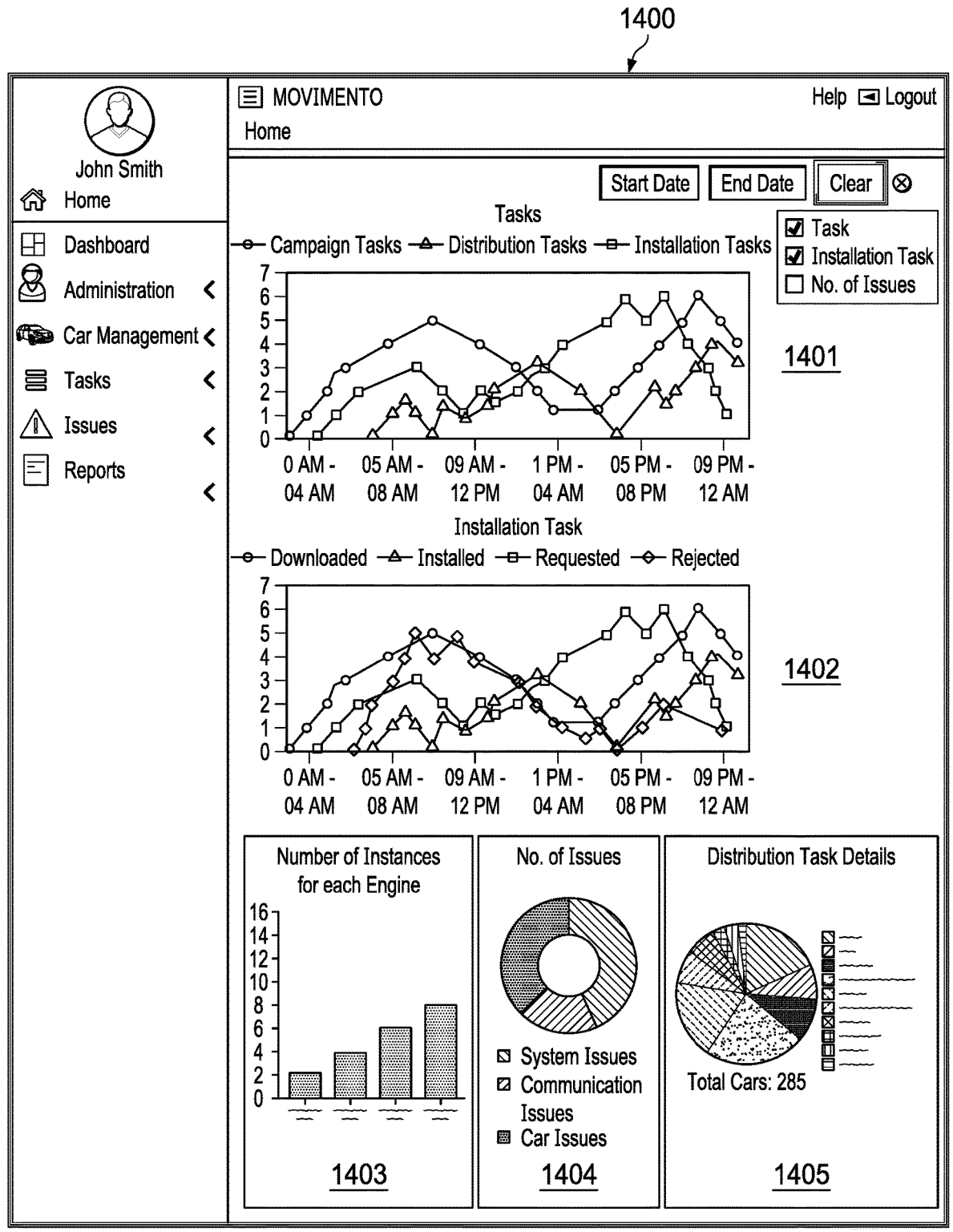
FIG. 14 is an example home screen including a variety of visualizations, according to an environment.

FIG. 14 is an example home page including a variety of visualizations, according to an embodiment. Home page 1400 may be used by and SA to get a complete overview of OTA operations through visualizations (e.g., line charts, bar charts, pie charts).

In the example shown, home page 1400 includes Task line chart 1401 showing the number of active Campaign Tasks, Distribution Tasks and Installation Tasks over a user-specified time period. Below Task line chart 1401 is Installation Task line chart 1402, showing the status of Installation Tasks over the user-specified time period. Below Installation Task line chart 1402 is Instance bar chart 1403 showing the number of instances of each engine (e.g., transformation engine, intelligence engine, message engine, operation engine) in MSP 101 to give an overview of the system load. Next to Instance bar chart 1403 is Issue pie chart 1404 showing a breakdown of issues by percentages. Next to Issue pie chart 1404 is Distribution Task pie chart 1405 showing Distribution Task details in percentages, such as the percentage of offered, to do, no update, implementation in progress, installed, download in progress, downloaded, rejected, failed and postponed.

Home page 1400 described above is an example and other embodiments may include more, fewer or different visualizations. For example, visualizations can include 3D charts (e.g., mesh plots), animations, horizontal bar charts, scatter plots, histograms, etc. There can also be text and audio reports. Home page 1400 can be configured based on the size and resolution of the display screen. In an embodiment, each visualization can be manually resized and/or moved around the display screen by the user to create a customized screen.

Example Mobility Client Architecture

Figure 15:
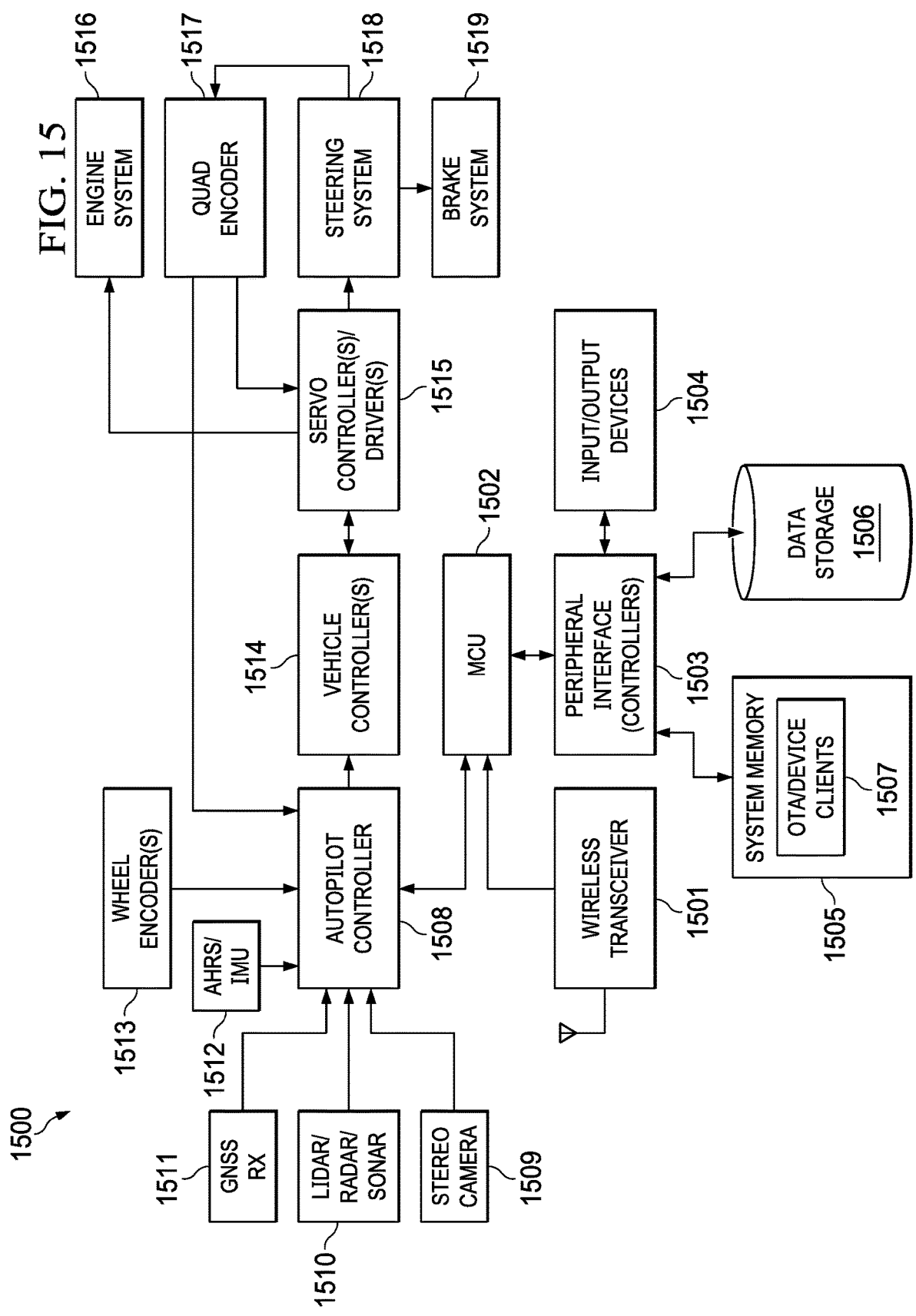
FIG. 15 is a system block diagram of a self-driving vehicle, according to an embodiment.

FIG. 15 is a system block diagram of a self-driving vehicle system 1500, according to an embodiment. System 1500 is one example of a system topology and other systems may contain more or fewer components or subsystems.

System 1500 includes wireless transceiver (TX) 1501, microcontroller unit (MCU) 1502, peripheral interface 1503, input/output devices 1504, system memory 1505, data storage 1506, engine system 1516, steering system 1518 and brake system 1519. In some exemplary embodiments, system 1500 optionally includes one or more of OTA/device clients 1507, autopilot controller 1508, stereo camera 1509, LiDAR 1510, GNSS receiver 1511, attitude and heading reference system (AHRS) 1512, wheel encoder(s) 1513, vehicle controller(s) 1514, servo controller(s)/drivers(s) 1515, engine system 1516 and quad encoder 1517. All of these system components are coupled to one or more buses/networks, including but not limited to: a CAN bus, FlexRay™ and Ethernet. Different types of busses/networks (e.g., that use different bus/network protocols) can be coupled together using gateways that can translate or map between the different bus/network protocols.

Wireless TX 1501 includes a radio frequency (RF) transmitter and receiver for transmitting and sending messages using OTA service provisioning (OTASP), OTA provisioning (OTAP) or OTA parameter administration (OTAPA). Wireless transmissions (e.g., messages) can be sent and received using any known wireless communication protocol, including but not limited to: OTA, OMA-DM, 2G, 3G, 5G, IEEE 802.15.4, WiFi, ZigBee, Bluetooth, etc.

MCU 1502 is a centralized processor that is coupled to wireless TX 1501 and is responsible for accessing data stored in system memory 1505 and data storage 1506 through peripheral interface 1503. Peripheral interface 1503 can include one or more I/O controllers and are coupled to input/output devices 1504, including display screens (e.g., LCD, LED, OLED, touch screens, surfaces or pad), pointing devices, switches, buttons and any other mechanical or virtual input/output mechanisms. The I/O controllers are configured or programmed to send and receive commands and/or data (unidirectional or bi-directional) over synchronous or asynchronous buses/interfaces, including full-duplex, half-duplex, master/slave, multi-master, point-to-point or peer, multi-drop and multi-point buses/interfaces.

In an embodiment, system memory 1505 (e.g., RAM, ROM, Flash) stores instructions to be executed by MCU 1502, including an operating system and applications. System memory 1505 store OTA/device clients 1507 for facilitating OTA service, as discussed in reference to FIGS. 3A and 3B.

MCU 1502 is coupled to autopilot controller 1508. Autopilot controller 1508 is responsible for receiving and processing sensor data from stereo camera 1509, LiDAR/Sonar 1510, GNSS RX 1511, AHRS 1512, and generating autopilot commands based on analysis of the sensor data. AHRS 1512 includes sensors on three axes that provide attitude and heading information for the vehicle, including roll, pitch and yaw in a suitable reference coordinate frame. The sensors can be either solid-state or microelectromechanical systems (MEMS) gyroscopes, accelerometers and magnetometers. In an embodiment, a non-linear estimator, such as an Extended Kalman filter is used to compute a navigation solution from data provided by AHRS 1512. Other sensors can be included in system 1500 including but not limited to temperature sensors, pressure sensors and ambient light sensors.

GNSS RX 1511 can be any satellite-based positioning system receiver, including but not limited to: Global Positioning System (GPS), GLONASS, Galileo and BeiDou. Other position technologies include WiFi positioning (e.g., using WiFi fingerprint database and Bayes' predictor) and cell towers (e.g., using trilateration, time of flight (TOF), angle of arrival (AOA)).

Autopilot controller uses various AI technologies for routing and collision avoidance. An example technology is Bayesian Simultaneous localization and mapping (SLAM) algorithms, which fuse data from multiple sensors and an off-line map into current location estimates and map updates. Another example, is SLAM with detection and tracking of other moving objects (DATMO), which also handles cars and pedestrians. Less complex systems may use roadside real-time locating system (RTLS) beacon systems to aid localization. Another example is visual object recognition using machine vision, including deep learning or neural networks having multiple stages or levels in which neurons are simulated from the environment that activate the network. The neural network can be trained on data extracted from real life driving scenarios. The neural network is activated and "learns" to perform the best course of action based on the driving scenarios.

Vehicle controller(s) 1514 can include TCUS, ECUs and any controller that is used to control a vehicle subsystem. Vehicle controller (s) 1514 receives command from autopilot controller 1508 and generates control commands to server controller(s)/driver(s) 1515 for controlling/driving various vehicle subsystems, including but not limited to: engine system 1516, steering system 1518 and brake system 1519.

In addition to sensors, system 1500 includes various encoders, including quad encoder 1517 for measuring steering angles and wheel encoder 1513 for measuring wheel rotations. Encoders 1513, 1517 provide output to autopilot controller 1508 to be factored into is computations.

Figure 16:
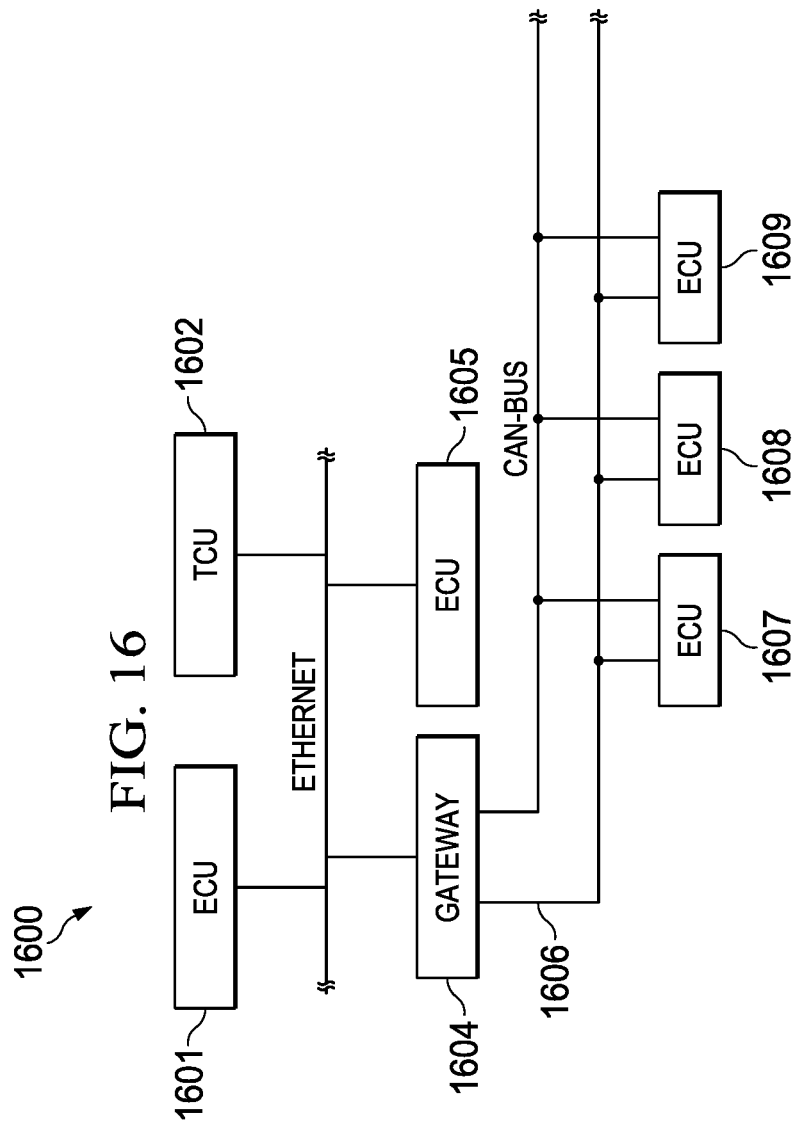
FIG. 16 is a system block diagram of a distributed computing architecture for a vehicle, according to an embodiment.

FIG. 16 is a system block diagram of a distributed computing architecture for a vehicle, according to an embodiment. System 1600 includes TCU 1602, and ECUs 1601, 1605 coupled to Ethernet 1603. Ethernet 1603 is coupled to CAN bus 1606 by gateway 1604. CAN bus includes ECUs 1607, 1608 and 1609. System 1600 is an example topology and other topologies can include more or fewer ECUs, gateways and busses.

An ECU can control a series of actuators on an internal combustion engine to ensure optimal engine performance by reading values from a number of sensors within an engine bay, interpreting the values using multidimensional performance maps (e.g., lookup tables), and adjusting the engine actuators based on the interpreted values. Each ECU includes a microprocessor which processes the inputs from various sensors (e.g., engine sensors) in real-time. An ECU contains hardware including electronic components on a printed circuit board (PCB). The main component on the PCB is a microcontroller unit (MCU) or central processing unit (CPU). The software/firmware is stored in the MCU/CPU cache or other memory chips on the PCB, such as EPROM or flash memory. In an embodiment, the MCU/CPU can be reprogrammed (reflashed) by downloading updated code using OTA operations as described in reference to FIGS. 2 and 3. CAN bus 1606 allow TCU 1602 and ECUs 1601, 1605, 1607, 1608, 1609 to communicate with each other without a host computer using a message-based protocol. Gateway 1604 is also an ECU used inside the vehicle to translate traffic from one vehicle bus to another, such as between CAN bus 1606 and Ethernet 1603. Gateway 1604 can provide connectivity to a number of different types of buses, including CAN, LIN, and FlexRay®. Gateway 1604 translates data between multiple buses of the same protocol or translates to different types of buses to ensure that the TCU and ECUs have the right information they need for the vehicle to operate as expected.

Alternative OTA Update Methods

1. OTA Update Method Using SIM/eUICC Card

Subscriber Identity Module (SIM) cards and embedded universal integrated circuit card (eUICC) (e.g., soft SIM, eSIM) are typically included in a cellular modem installed in vehicles for connectivity. Modern SIM/eUICC cards include a smart card operating system (e.g., JavaCard® OS) that can be used to run a virtual machine (VM) for small applications, and to store cellular profiles, applications, etc. An OTA client application can be installed on the eUICC for JavaCard® can be used for basic OTA bootstrapping, and can be accessed from a host CPU in the vehicle through, for example, an application programming interface (API). The OTA client application can also store a user and/or device identity data. For example, a eUICC subscription management system can load or modify user and/or device identify data in the eUICC. The user and/or device identity data can be accessed by a host application running on host computer through an API.

In an embodiment, an apparatus that performs OTA updates using a SIM/eUICC card comprises: a wireless modem configured to establish a wireless communication link with a network; an integrated circuit module securely storing a mobile subscriber identity and a related key, which are used to identify and authenticate a subscriber on the apparatus; memory embedded in the integrated circuit module storing instructions for an operating system, a virtual machine and an over-the-air (OTA) client software; one or more processors executing instructions of the operating system, virtual machine and OTA client software to: establish a communication session with an OTA mobility services platform; and perform, during the communication session, one or more OTA operations with the OTA mobility services platform.

In an embodiment, the memory stores an identifier for the apparatus. In an embodiment, the one or more OTA operations comprise: receiving a broadcast or multicast of one or more images or files, where each image or file includes a vehicle identifier; obtaining, from the OTA mobility services platform, cryptographic data (e.g., encrypted hash) of the image or file; and verifying, using the cryptographic data, the image or file.

2. OTA Update Method Using Home/IoT Gateway

In an embodiment, a smartphone application acts as a proxy server between the OTA distributed computing platform and the OTA client in the vehicle. For example, the application can connect to the vehicle through a wireless connection (e.g., Bluetooth connection) or a physical port (e.g., a USB port) to obtain vehicle data (e.g., VIN, ID, software versions). The smartphone then connects to the OTA distributed computing platform through a home gateway (e.g., a WiFi router in the user's home) and obtains the OTA update (e.g., a software update). At a later time, convenient to the user, the user connects the smartphone to the vehicle again and performs the OTA update on the vehicle software. In an embodiment, the vehicle connects to the user's home gateway through a wireless connection (e.g., WiFi connection) and controls the OTA update process through the smartphone application that connects to the home gateway.

In an embodiment, an OTA update method that uses a home or IoT gateway comprises: establishing, by one or more processors of a mobile device (e.g., mobile phone, thumb drive), a first communication session (e.g., a Bluetooth, WiFi session, USB connection) with a vehicle computer (e.g., an automobile computer or TCU or ECU); receiving, through the wireless connection, a vehicle identifier associated with the vehicle (e.g., a VIN) and data identifying code or data installed on the vehicle (e.g., software ID and/or version number); establishing, by the one or more processors, a second communication session with an over-the-air (OTA) mobility services platform (e.g., through a home gateway); receiving, during the second communication session and using the vehicle identifier, download information from the OTA mobility services platform (e.g., URL to retrieve a software/firmware update from a network-based storage device); retrieving, by the one or more processors using the download information, an update to the code or data (e.g., a diff file for updating firmware/software files); storing, by the one or more processors, the update in a storage device accessible by the mobile device; establishing, by the one or more processors, a third communication session with the vehicle (e.g., a Bluetooth, WiFi session, USB connection); and transferring, during the third communication session, the update to the vehicle. In an embodiment, the second communication session is established through a wireless local area network. In an embodiment, the first and third communication sessions are IEEE 802.11x, IEEE 802.15.x, near-field communication (NFC) or Bluetooth™ communication sessions. In an embodiment, the first and third communication sessions are established through a communication port (e.g., USB port) of the vehicle computer.

3. OTA Update Method Using Broadcast or Multicast

In an embodiment, the MSP provides a continuous broadcast or multicast digital signed OTA images (e.g., delta files)

to mobility clients in blocks with IDs. The mobility clients collect all or part of an image based on the ID and establish communication with the MSP to obtain an encrypted hash of the image to authenticate the image signature. The usual communication with the MSP (e.g., registration, offering, signature, etc.) is required bit is very short in duration. In an embodiment, the broadcast or multicast can be done over a cellular network (e.g., using an instant messing service (IMS)). In an embodiment, an additional or complementary broadcast network can be used, including but not limited to radio (e.g., FM radio), satellite and WiFi networks.

While this document contains many specific implementation details, the implementation details should not be construed as limitations on the scope of what may be claimed but rather as a description of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

While logic flows or operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various software components in the embodiments described above should not be understood as requiring such separation in all embodiments, and it should be understood that the described software components can generally be integrated together in a single software program or multiple software programs.

Some aspects of the subject matter of this specification may include gathering and use of data available from various sources. The present disclosure contemplates that in some instances, this gathered data may identify a particular location or an address based on device usage. Such personal information data can include location-based data, addresses, subscriber account identifiers, or other identifying information. The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure.

What is claimed is:

1. A method comprising:
   creating, by one or more processors of an over-the-air (OTA) mobility services platform, virtual representations of mobility clients that include unique identifiers for the mobility clients and data structures with an update information field and one or more extended fields that provide an interface operable for sending and receiving data or services from one or more data or service providers that are external to the OTA mobility services platform, wherein the data structures included in the virtual representations are copies of data structures of the mobility clients;
   storing, by the one or more processors, the virtual representations in one or more databases accessible by the OTA mobility services platform;
   receiving, by the one or more processors, a plurality of user inputs specifying a mobility client model and a plurality of software models that are associated with the mobility client model, the mobility client model defining a plurality of hardware components installed on a mobility client that execute software defined by the software models, the plurality of software models also defining interdependencies between one or more versions of the plurality of software models;
   generating, by the one or more processors, update files for software updates stored in a data repository and download information files including instructions for downloading and installing the update files, the instructions defining an installation order hierarchy that preserves the interdependencies between the one or more versions of the plurality of software models, the update files generated for each mobility client based at least in part on the update information field of its virtual representation;
   generating, by the one or more processors, a distribution task, the distribution task including a start time, an end time and a mobility client group;
   generating, by the one or more processors, installation tasks for mobility clients in the mobility client group;
   in accordance with the installation tasks:
      transferring, by the one or more processors, the download information files to the mobility clients in the mobility client group; and
      in accordance with the download information files, transferring the update files to the mobility clients in the mobility client group.

2. The method of claim 1, further comprising:
   monitoring, by the one or more processors, the installation tasks to detect an issue with the installation tasks;
   in accordance with detecting the issue and responsive to the plurality of user inputs:
      assigning, by the one or more processors, the issue to a member of a user class of the mobility services platform based on an issue type; and
      changing, by the one or more processors, a status of the installation tasks after the issue is resolved.

3. The method of claim 1, further comprising:
   determining, by the one or more processors, the mobility client group based on location data provided by the mobility clients in the mobility client group.

4. The method of claim 3, wherein the mobility client group is determined based on the location data and a geofence.

5. The method of claim 1, wherein the OTA mobility services platform is a distributed computing platform that includes a data stream processing pipeline architecture for processing data feeds from the mobility clients using a scalable publication/subscription message queue as a distributed transaction log.

6. The method of claim 1, wherein the OTA mobility services platform comprises multiple instances of software that run concurrently and communicate with each other over a message bus.

7. The method of claim 1, further comprising:
   using the one or more extended fields to provide data or services to, or receive data from, the mobility client, where the mobility client is a vehicle.

8. A method comprising:
creating, by one or more processors of a mobility client of an over-the-air (OTA) mobility services platform, a virtual representation of the mobility client that includes a unique identifier for the mobility client and data structures with an update information field and one or more extended fields that provide an interface operable for sending and receiving data or services from one or more data or service providers that are external to the OTA mobility services platform, wherein the data structures included in the virtual representations are copies of data structures of the mobility clients;
sending, by the one or more processors, the virtual representation to the OTA mobility services platform;
receiving, by the one or more processors, a download information file including instructions for downloading and installing update files from a data repository, the instructions defining an installation order hierarchy that preserves interdependencies between one or more versions of a plurality of software models defining software installed on the mobility client;
in accordance with the instructions, downloading the update files to the mobility client;
in accordance with the installation order hierarchy, initiating, by the one or more processors, installation of the update files on the mobility client; and
updating the update information field of the virtual representation to indicate a current version of the software installed on the mobility client after the update is completed,
wherein the installation order hierarchy is determined by a topological sort.

9. The method of claim 8, the method further comprising:
using the one or more extended fields to provide data or services to, or receive data from, the mobility client, where the mobility client is a vehicle.

10. The method of claim 8, wherein the download information file includes links to the update files stored in a network-based data repository.

11. An over-the-air (OTA) mobility services platform, comprising:
one or more processors;
memory; and
one or more programs stored in the memory, that when executed by the one or more processors, cause the one or more processors to perform operations comprising:
creating virtual representations of mobility clients that include unique identifiers for the mobility clients and data structures with an update information field and one or more extended fields that provide an interface operable for sending and receiving data or services from one or more data or service providers that are external to the OTA mobility services platform, wherein the data structures included in the virtual representations are copies of data structures of the mobility clients;
storing the virtual representations in one or more databases accessible by the OTA mobility services platform;
receiving a plurality of user inputs specifying a mobility client model and a plurality of software models that are associated with the mobility client model, the mobility client model defining a plurality of hardware components installed on a mobility client that execute software defined by the software models, the plurality of software models also defining interdependencies between one or more versions of the plurality of software models;
generating update files for software updates stored in a data repository and download information files including instructions for downloading and installing the update files, the instructions defining an installation order hierarchy that preserves the interdependencies between the one or more versions of the plurality of software models, the update files generated for each mobility client based at least in part on the update information field of its virtual representation;
generating a distribution task, the distribution task including a start time, an end time and a mobility client group;
generating installation tasks for mobility clients in the mobility client group;
in accordance with the installation tasks:
transferring the download information files to the mobility clients in the mobility client group; and
in accordance with the download information files,
transferring the update files to the mobility clients in the mobility client group.

12. The OTA mobility services platform of claim 11, wherein the operations further comprise:
monitoring, the installation tasks to detect an issue with the installation tasks;
in accordance with detecting the issue and responsive to the plurality of user inputs:
assigning the issue to a member of a user class of the mobility services platform based on an issue type; and
changing a status of the installation tasks after the issue is resolved.

13. The OTA mobility services platform of claim 11, wherein the operations further comprise:
determining the mobility client group based on location data provided by the mobility clients in the mobility client group.

14. The OTA mobility services platform of claim 13, wherein the mobility client group is determined based on the location data and a geofence.

15. The OTA mobility services platform of claim 11, wherein the OTA mobility services platform is a distributed computing platform that includes a data stream processing pipeline architecture for processing data feeds from the mobility clients using a scalable publication/subscription message queue as a distributed transaction log.

16. The OTA mobility services platform of claim 11, wherein the OTA mobility services platform comprises multiple instances of software that run concurrently and communicate with each other over a message bus.

17. The OTA mobility services platform of claim 11, further comprising:
using the one or more extended fields to provide data or services to, or receive data from, the mobility client, where the mobility client is a vehicle.

18. A mobility client of an over-the-air (OTA) mobility services platform, comprising:
one or more processors;
memory; and
one or more programs stored in the memory, that when executed by the one or more processors, cause the one or more processors to perform operations comprising:
creating, by the one or more processors, a virtual representation of the mobility client that includes a unique identifier for the mobility client and data structures with an update information field and one or more extended fields that provide an interface operable for sending and receiving data or services from one or more data or service providers that are external to the OTA mobility services platform, wherein the data structures included in the virtual representations are copies of data structures of the mobility clients;

sending, by the one or more processors, the virtual representation to the OTA mobility services platform;

receiving a download information file including instructions for downloading and installing update files from a data repository, the instructions defining an installation order hierarchy that preserves interdependencies between one or more versions of a plurality of software models defining software installed on the mobility client;

in accordance with the instructions, downloading the update files to the mobility client;

in accordance with the installation order hierarchy, initiating, by the one or more processors, installation of the update files on the mobility client; and updating the update information field of the virtual representation to indicate a current version of the software installed on the mobility client after the update is completed, wherein the installation order hierarchy is determined by a topological sort.

19. The mobility client of claim 18, wherein the download information file includes links to the update files stored in a network-based data repository.

20. The OTA mobility services platform of claim 18, the operations further comprising:

using the one or more extended fields to provide data or services to, or receive data from, the mobility client, where the mobility client is a vehicle.

21. A method comprising:

creating, by one or more processors of an over-the-air (OTA) mobility services platform, virtual representations of vehicles that include unique identifiers for the vehicles and data structures with an update information field and one or more extended fields that provide an interface operable for sending and receiving data or services from one or more data or service providers that are external to the OTA mobility services platform, wherein the data structures included in the virtual representations are copies of data structures of the vehicles;

storing, by the one or more processors, the virtual representations in one or more databases accessible by the OTA mobility services platform;

receiving, by the one or more processors, a plurality of user inputs specifying a vehicle model and a plurality of software models that are associated with the vehicle model, the vehicle model defining a plurality of hardware components installed on a vehicle that execute software defined by the software models, the plurality of software models also defining interdependencies between one or more versions of the plurality of software models;

generating, by the one or more processors, update files for software updates stored in a data repository and download information files including instructions for downloading and installing the update files, the instructions defining an installation order hierarchy that preserves the interdependencies between the one or more versions of the plurality of software models, the update files generated for each vehicle based at least in part on the update information field of its virtual representation;

transferring, by the one or more processors, the download information files to the vehicles; and in accordance with the download information files, transferring the update files to the vehicles.

22. The method of claim 21, wherein the one or more extended fields include personal profile data related to a personal preference of an occupant of the vehicle.

23. An over-the-air (OTA) mobility services platform, comprising:

one or more processors;

memory; and one or more programs stored in the memory, that when executed by the one or more processors, cause the one or more processors to perform operations comprising:

creating virtual representations of vehicles that include unique identifiers for the vehicles and data structures with an update information field and one or more extended fields that provide an interface operable for sending and receiving data or services from one or more data or service providers that are external to the OTA mobility services platform, wherein the data structures included in the virtual representations are copies of data structures of the vehicles;

storing the virtual representations in one or more databases accessible by the OTA mobility services platform;

receiving a plurality of user inputs specifying a vehicle model and a plurality of software models that are associated with the vehicle model, the vehicle model defining a plurality of hardware components installed on a vehicle that execute software defined by the software models, the plurality of software models also defining interdependencies between one or more versions of the plurality of software models;

generating update files for software updates stored in a data repository and download information files including instructions for downloading and installing the update files, the instructions defining an installation order hierarchy that preserves the interdependencies between the one or more versions of the plurality of software models, the update files generated for each vehicle based at least in part on the update information field of its virtual representation;

transferring the download information files to the vehicles; and in accordance with the download information files, transferring the update files to the vehicles.

24. The OTA mobility services platform of claim 23, wherein the one or more extended fields include personal profile data related to a personal preference of an occupant of the vehicle.

* * * * *